(12) United States Patent
Pankaj

(10) Patent No.: US 6,393,012 B1
(45) Date of Patent: May 21, 2002

(54) SYSTEM FOR ALLOCATING RESOURCES IN A COMMUNICATION SYSTEM

(75) Inventor: Rajesh K. Pankaj, San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 0 days.

(21) Appl. No.: 09/479,735

(22) Filed: Jan. 7, 2000

Related U.S. Application Data

(63) Continuation-in-part of application No. 09/229,432, filed on Jan. 13, 1999, now Pat. No. 6,229,795.

(51) Int. Cl.[7] .............................................. H04B 7/216
(52) U.S. Cl. ...................................... 370/342; 370/468
(58) Field of Search ................................. 370/229–236, 370/328, 329, 335, 341, 342, 431, 412, 428, 441, 468; 455/450, 451, 452

(56) References Cited

U.S. PATENT DOCUMENTS

| | | | |
|---|---|---|---|
| 5,859,835 A | | 1/1999 | Varma et al. ............... 370/229 |
| 5,923,650 A | | 7/1999 | Chen et al. ................ 370/331 |
| 5,933,462 A | | 8/1999 | Viterbi et al. ............... 375/341 |
| 5,982,758 A | * | 11/1999 | Hamdy ....................... 370/331 |
| 6,028,852 A | * | 2/2000 | Miya et al. ................. 370/335 |
| 6,031,827 A | * | 2/2000 | Rikkinen et al. ........... 370/330 |
| 6,064,678 A | | 5/2000 | Sindhushayana et al. ... 370/470 |

OTHER PUBLICATIONS

Calin, et al. "Traffic Scheduling and Fairness for GPRS Air Interface" IEEE Conf. 50: 834–838 (Sep. 19–22, 1999, Amsterdam).

* cited by examiner

*Primary Examiner*—Ajit Patel
(74) *Attorney, Agent, or Firm*—Philip R. Wadsworth; Kent D. Baker; Byron Yafuso

(57) ABSTRACT

A method and apparatus for allocating and using a finite resource to transmit wireless information signals to a plurality of subscriber units is disclosed. Individual subscriber units transmit data rate requests to serving base stations. The data rate requests and weight values associated with each subscriber unit are compared in order to select a subscriber unit as the recipient of data transmitted through the finite resource at any given time. To maximize throughput without starving any single subscriber unit, the method includes calculation and comparison of a desirability metric in choosing a subscriber unit from among a subset of the plurality of subscriber units having comparable weight values.

33 Claims, 19 Drawing Sheets

SYSTEM FOR ALLOCATING RESOURCES IN A COMMUNICATION SYSTEM

This is a continuation-in-part of U.S. patent application Ser. No. 09/229,432, filed Jan. 13, 1999, now U.S. Pat. No. 6,229,795, issued May 8, 2001.

BACKGROUND

1. Field of the Invention

The present application relates to communication systems. Particularly, these embodiments are directed to allocating communication resources among the plurality of subscribers to a communication system.

2. Related Art

Several solutions have been presented to address the problem of allocating limited communication resources provided by a single node in a communication system among a plurality of subscribers. It is an objective of such systems to provide sufficient resources at the nodes to satisfy the requirements of all subscribers while minimizing costs. Accordingly, such systems are typically designed with the objective of efficient allocation of resources among the various subscribers.

Various systems have implemented a frequency division multiple access (FDMA) scheme which allocates resources to each of the subscribers concurrently. A communication node in such systems typically has a limited bandwidth for either transmitting information to or receiving information from each subscriber in the network at any point in time. This scheme typically involves allocating distinct portions of the total bandwidth to the individual subscribers. While such a scheme may be effective for systems in which subscribers require uninterrupted communication with the communication node, better utilization of the total bandwidth may be achieved when such constant, uninterrupted communication is not required.

Other schemes for allocating communication resources of a single communication node among a plurality of subscribers includes time division multiple access (TDMA) schemes. These TDMA schemes are particularly effective in allocating the limited bandwidth resources of a single communication node among a plurality of subscribers which do not require constant, uninterrupted communication with the single communication node. TDMA schemes typically dedicate the entire bandwidth of the single communication node to each of the subscribers at designated time intervals. In a wireless communication system which employs a code division multiple access (CDMA) scheme, this may be accomplished by assigning to each of the subscriber units all code channels at the designated time intervals on a time multiplexed basis. The communication node implements the unique carrier frequency or channel code associated with the subscriber to enable exclusive communication with the subscriber. TDMA schemes may also be implemented in land line systems using physical contact relay switching or packet switching.

TDMA systems typically allocate equal time intervals to each subscriber in a round robin fashion. This may result in an under utilization of certain time intervals by certain subscribers. Similarly, other subscribers may have communication resource requirements which exceed the allocated time interval, leaving these subscribers under served. The system operator then has the choice of either incurring the cost of increasing the bandwidth of the node to ensure that none of the subscribers are under served, or allowing the under served subscribers to continue to be under served.

Accordingly, there is a need to provide a system and method of allocating communication resources among subscribers to a communication network efficiently and fairly according to a network policy of allocating the communication resources among the subscribers.

SUMMARY

An object of an embodiment of the present invention is to provide a system and method for allocating a finite resource of a communication system among a plurality of subscribers.

Another object of an embodiment of the present invention is to provide a system and method for allocating data transmission resources among a plurality of subscribers which have varying capacities to receive data.

It is another object of an embodiment of the present invention to provide a system and method for optimally allocating data transmission resources among a plurality of subscribers subject to a fairness criteria according to a network policy.

It is another object of an embodiment of the present invention to provide a system and method for allocating data transmission resources of a base station among a plurality of remote stations in a wireless communication network.

It is yet another object of an embodiment of the present invention to provide a system and method for enhancing the efficiency of transmitting data to a plurality of subscribers in a variable rate data transmission network by allocating transmission resources to each individual subscriber based upon the rate at which the subscriber can receive transmitted data.

Briefly, an embodiment of the present invention is directed to a resource scheduler in a communication system which includes a common node and a plurality of customer nodes associated with the common node. The common node, at any particular service interval, is capable of providing a finite resource to be seized by one or more engaging customer nodes to the exclusion of any remaining customer nodes. The resource scheduler includes logic for maintaining a weight or score associated with each of the customer nodes, logic for selecting one or more of the remaining customer nodes to seize the finite resource in a subsequent service interval based upon a comparison of the weight associated with each of the selected customer nodes and the respective weights associated with the other remaining customer nodes, and logic for changing the weights associated with the customer nodes to cause an optimal allocation of the finite resource subject to a fairness criteria.

The resource scheduler may maintain the weights associated with each customer node based upon the instantaneous rate at which the customer node can receive data from the common node. The resource scheduler may then favor transmission to the customer nodes having the higher rates of receiving data. By maintaining a weight associated with each of the customer nodes, and selecting individual customer nodes to seize the common node, the scheduler can optimally allocate resources to the customer nodes subject to a fairness criteria.

In the embodiment where the common node provides data transmission resources to the customer nodes, for example, the scheduler may apply weights to the individual customer nodes so as to favor those customer nodes capable of receiving data at higher rates. Such a weighting tends to enhance the overall data throughput of the common node. In another embodiment, the weights are applied in a manner so that the scheduler also complies with the fairness criteria.

In one aspect of the invention, a method of allocating a finite resource in a communication system is provided, the communication system including a common node and a plurality of customer nodes associated with the common node, each of the customer nodes having a requested data rate, wherein during any particular service interval the common node allocates the finite resource to one of the customer nodes to the exclusion of any remaining customer nodes, the method comprising the steps of: maintaining a set of weights having one weight corresponding to each of the customer nodes; identifying a minimum weight M from said set of weights; identifying a subset of said customer nodes having weights less than or equal to the sum of M and an offset K; determining a desirability metric value for each customer node in said subset; selecting, from said subset, a most desired customer node having the greatest desirability metric value; exchanging data between the common node and said most desired customer node through the finite resource and at the data rate associated with said most desired customer node; and changing said set of weights based on said most desired customer node and the data rate associated with said most desired customer node.

In anther aspect of the invention, a wireless transmitter apparatus is provided, comprising: at least one antenna for receiving requested data rate signals from each of a plurality of customer nodes and for directing information signals to said plurality of customer nodes; a channel element for modulating a data signal for transmission through said at least one antenna to each of said plurality of customer nodes; and a channel scheduler for maintaining a set of weights corresponding to each of the customer nodes, identifying a minimum weight M from said set of weights, identifying a subset of said customer nodes having weights less than or equal to the sum of M and an offset K, determining a desirability metric value for each customer node in the subset, selecting from the subset a most desired customer node having the greatest desirability metric value, providing information corresponding to the most desired customer node to said channel element, and updating the set of weights.

While the embodiments disclosed herein are directed to methods and systems for allocating data transmission resources to subscribers through a forward channel in a data service network, the underlying principles have even broader applications to the allocation of resources among elements in a communication system generally. The disclosed embodiments are therefore intended to be exemplary and not limiting the scope of the claims. For example, principles described herein are applicable to communication networks in which the customer nodes compete for the ability to transmit data to a common node through a limited reverse transmission channel.

DETAILED DESCRIPTION

Embodiments of the present invention are directed to a system and apparatus for allocating resources among a plurality of subscribers to a communication network which are serviced by a single communication node. At individual discrete transmission intervals, or "service intervals," individual subscribers seize a finite resource of the communication node to the exclusion of all other subscribers. The individual subscribers are selected to seize the finite resource based upon a weight or score associated with the individual subscribers. Changes in a weight associated with an individual subscriber are preferably based upon an instantaneous rate at which the individual subscriber is capable of consuming the finite resource.

Figure 1:
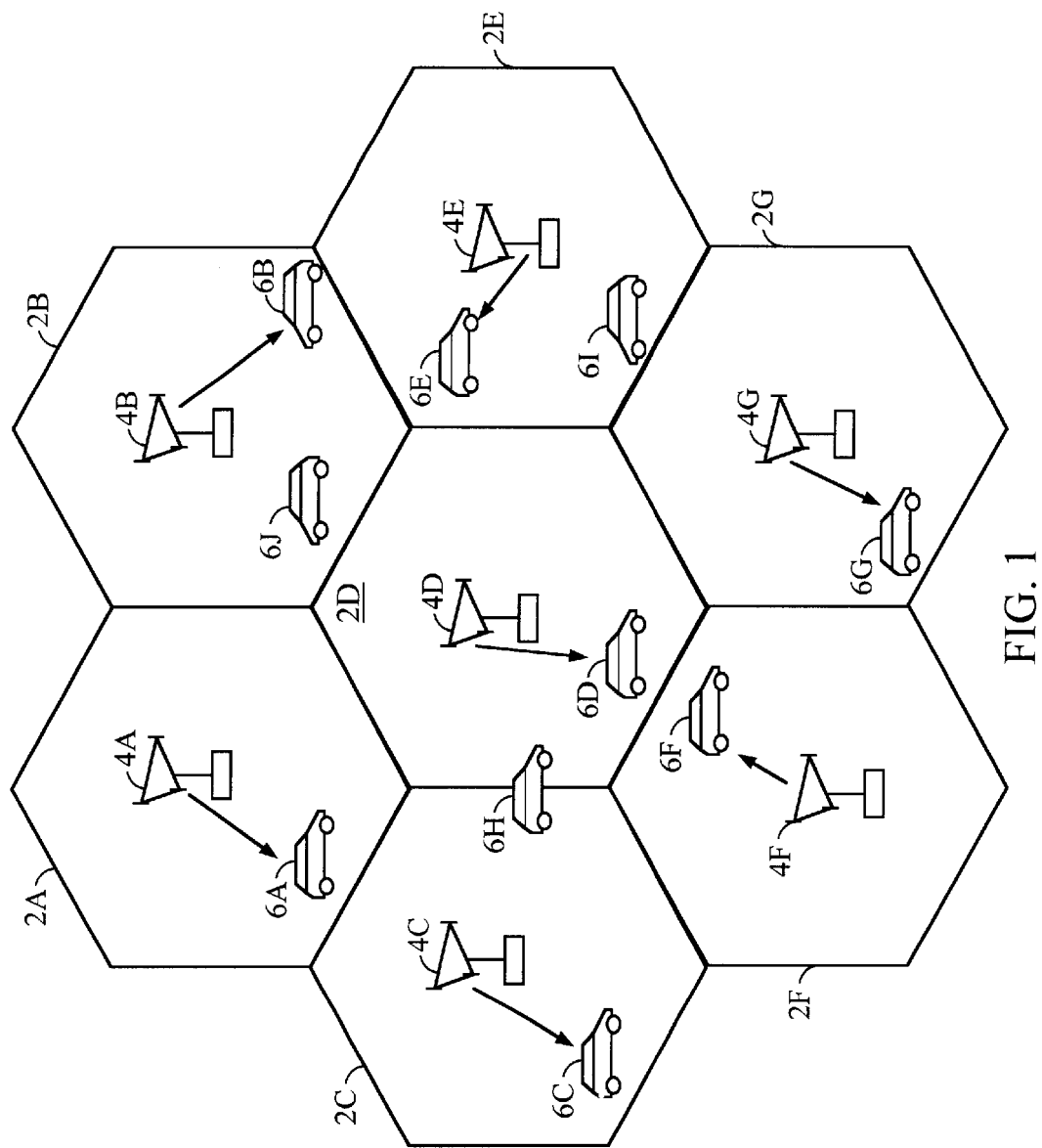
FIG. 1 shows a communication network according to an embodiment of the present invention.

Referring to the figures, FIG. 1 represents an exemplary variable rate communication system. One such system is described in the U.S. patent application Ser. No. 08/963,386, entitled Method and Apparatus for High Rate Packet Data Transmission, filed on Nov. 3, 1997, assigned to Qualcomm, Inc. and incorporated herein by reference. The variable rate communication system comprises multiple cells 2a–2g. Each cell 2 is serviced by a corresponding base station 4. Various remote stations 6 are dispersed throughout the communication system. In the exemplary embodiment, each of remote stations 6 communicates with at most one base station 4 on a forward link at any data transmission interval. For example, base station 4a transmits data exclusively to remote station 6a, base station 4b transmits data exclusively to remote station 6b, and base station 4c transmits data exclusively to remote station 6c on the forward link at time slot n. As shown by FIG. 1, each base station 4 preferably transmits data to one remote station 6 at any given moment. In other embodiments, the base station 4 may communicate with more than one remote station 6 at a particular data transmission interval to the exclusion of all other remote stations 6 associated with the base station 4. In addition, the data rate is variable and is dependent on the carrier-to-interference ratio (C/I) as measured by the receiving remote station 6 and the required energy-per-bit-to-noise ratio ($E_b/N_0$). The reverse link from remote stations 6 to base stations 4 is not shown in FIG. 1 for simplicity. According to an embodiment, the remote stations 6 are mobile units with wireless transceivers operated by wireless data service subscribers.

Figure 2A:
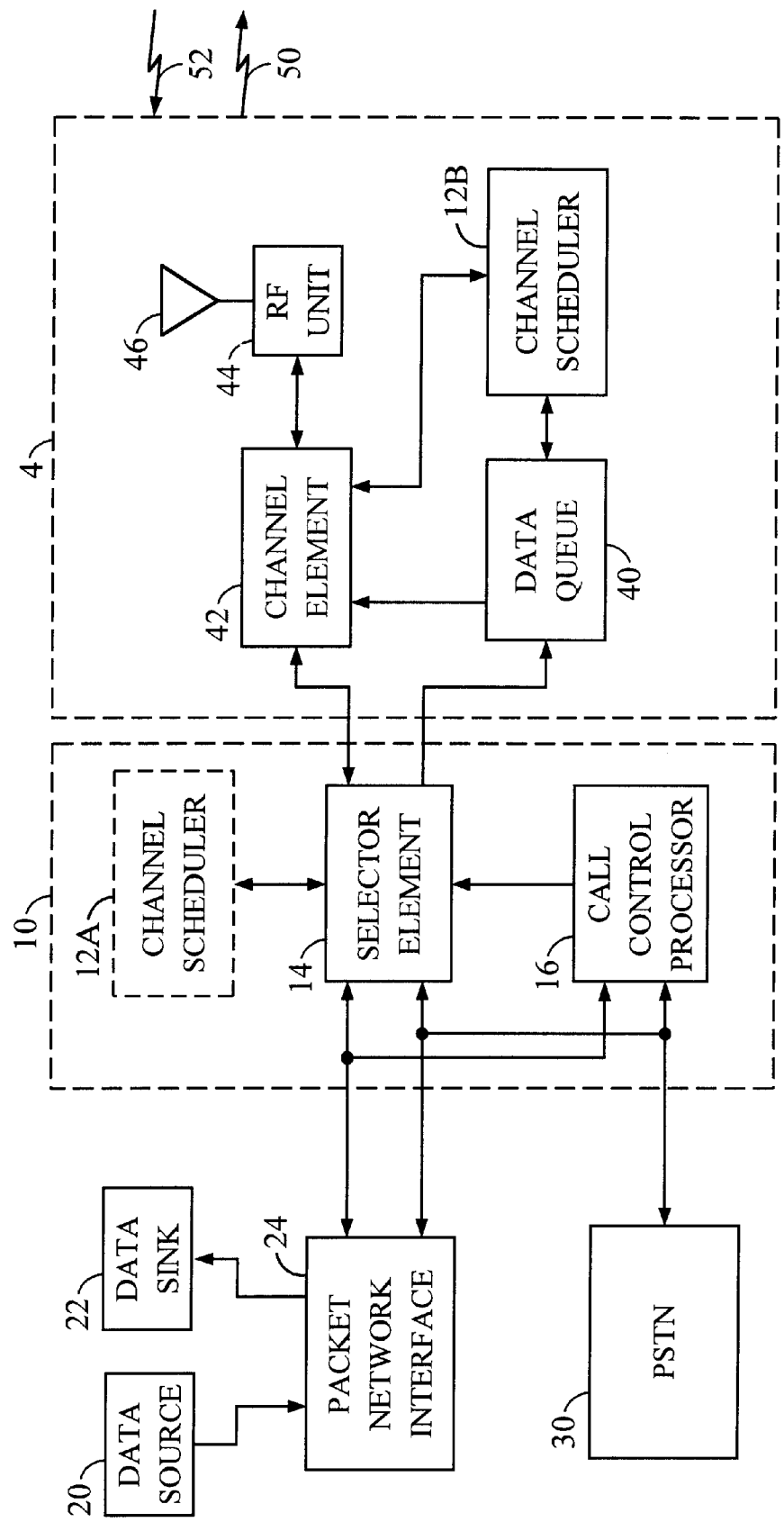
FIG. 2a shows a block diagram of a base station controller and base station apparatus configured in accordance with an embodiment of the present invention.
Figure 2B:
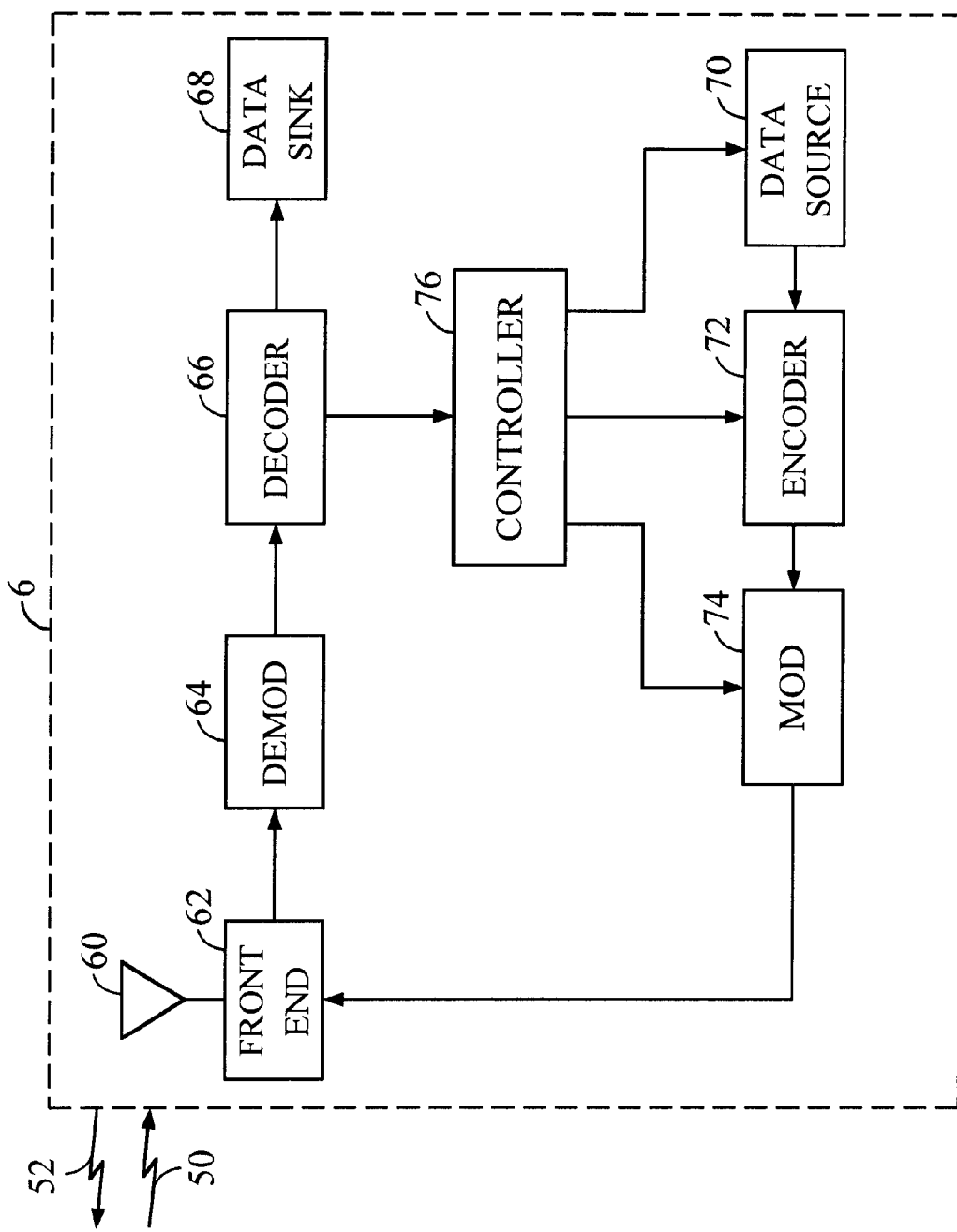
FIG. 2b shows a block diagram of a remote station apparatus configured in accordance with an embodiment of the present invention.

A block diagram illustrating the basic subsystems of an exemplary variable rate communication system is shown in FIGS. 2a–2b. Base station controller 10 interfaces with packet network interface 24, public switched telephone network (PSTN) 30, and all base stations 4 in the communication system (only one base station 4 is shown in FIG. 2 for simplicity). Base station controller 10 coordinates the communication between remote stations 6 in the communication system and other users connected to packet network interface 24 and PSTN 30. PSTN 30 interfaces with users through a standard telephone network (not shown in FIG. 2).

Base station controller 10 contains many selector elements 14, although only one is shown in FIG. 2 for simplicity. Each selector element 14 is assigned to control communication between one or more base stations 4 and one remote station 6. If selector element 14 has not been assigned to remote station 6, call control processor 16 is informed of the need to page remote station 6. Call control processor 16 then directs base station 4 to page remote station 6.

Data source 20 contains a quantity of data which is to be transmitted to the remote station 6. Data source 20 provides the data to packet network interface 24. Packet network interface 24 receives the data and routes the data to the selector element 14. Selector element 14 transmits the data to each base station 4 in communication with remote station 6. In the exemplary embodiment, each base station 4 maintains a data queue 40 which stores the data to be transmitted to the remote station 6.

The data is transmitted in data packets from data queue 40 to channel element 42. In the exemplary embodiment, on the forward link, a "data packet" refers to a quantity of data which is the maximum of 1024 bits and a quantity of data to be transmitted to a destination remote station 6 within a "time slot" (such as≈1.667 msec) . For each data packet, channel element 42 inserts the necessary control fields. In the exemplary embodiment, channel element 42 CRC encodes the data packet and control fields and inserts a set of code tail bits. The data packet, control fields, CRC parity bits, and code tail bits comprise a formatted packet. In the exemplary embodiment, channel element 42 then encodes the formatted packet and interleaves (or reorders) the symbols within the encoded packet. In the exemplary embodiment, the interleaved packet is covered with a Walsh code, and spread with the short PNI and PNQ codes. The spread data is provided to RF unit 44 which quadrature modulates, filters, and amplifies the signal. The forward link signal is transmitted over the air through antenna 46 on forward link 50.

At remote station 6, the forward link signal is received by antenna 60 and routed to a receiver within front end 62. The receiver filters, amplifies, quadrature demodulates, and quantizes the signal. The digitized signal is provided to demodulator (DEMOD) 64 where it is despread with the short PNI and PNQ codes and decovered with the Walsh cover. The demodulated data is provided to decoder 66 which performs the inverse of the signal processing functions done at base station 4, specifically the de-interleaving, decoding, and CRC check functions. The decoded data is provided to data sink 68.

The hardware, as pointed out above, supports variable rate transmissions of data, messaging, voice, video, and other communications over the forward link. The rate of data transmitted from the data queue 40 varies to accommodate changes in signal strength and the noise environment at the remote station 6. Each of the remote stations 6 preferably transmits a data rate control (DRC) signal to an associated base station 4 at each time slot. The DRC signal provides information to the base station 4 which includes the identity of the remote station 6 and the rate at which the remote station 6 is to receive data from its associated data queue. Accordingly, circuitry at the remote station 6 measures the signal strength and estimates the noise environment at the remote station 6 to determine the rate information to be transmitted in the DRC signal.

The DRC signal transmitted by each remote station 6 travels through reverse link channel 52 and is received at base station 4 through antenna 46 and RF unit 44. In the exemplary embodiment, the DRC information is demodulated in channel element 42 and provided to a channel scheduler 12a located in the base station controller 10 or to a channel scheduler 12b located in the base station 4. In a first exemplary embodiment, the channel scheduler 12b is located in the base station 4. In an alternate embodiment, the channel scheduler 12a is located in the base station controller 10, and connects to all selector elements 14 within the base station controller 10.

In the first-mentioned exemplary embodiment, channel scheduler 12b receives information from data queue 40 indicating the amount of data queued up for each remote station, also called queue size. Channel scheduler 12b then performs scheduling based on DRC information and queue size for each remote station serviced by base station 4. If queue size is required for a scheduling algorithm used in the alternate embodiment, channel scheduler 12a may receive queue size information from selector element 14.

Embodiments of the present invention are applicable to other hardware architectures which can support variable rate transmissions. The present invention can be readily extended to cover variable rate transmissions on the reverse link. For example, instead of determining the rate of receiving data at the base station 4 based upon a DRC signal from remote stations 6, the base station 4 measures the strength of the signal received from the remote stations 6 and estimates the noise environment to determine a rate of receiving data from the remote station 6. The base station 4 then transmits to each associated remote station 6 the rate at which data is to be transmitted in the reverse link from the remote station 6. The base station 4 may then schedule transmissions on the reverse link based upon the different data rates on the reverse link in a manner similar to that described herein for the forward link.

Also, a base station 4 of the embodiment discussed above transmits to a selected one, or selected ones, of the remote stations 6 to the exclusion of the remaining remote stations associated with the base station 4 using a code division multiple access (CDMA) scheme. At any particular time, the base station 4 transmits to the selected one, or selected ones, of the remote station 6 by using a code which is assigned to the receiving base station(s) 4. However, the present invention is also applicable to other systems employing different time division multiple access (TDMA) methods for providing data to select base station(s) 4, to the exclusion of the other base stations 4, for allocating transmission resources optimally.

The channel scheduler 12 schedules the variable rate transmissions on the forward link. The channel scheduler 12 receives the queue size, which is indicative of the amount of data to transmit to remote station 6, and messages from remote stations 6. The channel scheduler 12 preferably schedules data transmissions to achieve the system goal of maximum data throughput while conforming to a fairness constraint.

As shown in FIG. 1, remote stations 6 are dispersed throughout the communication system and can be in communication with zero or one base station 4 on the forward link. In the exemplary embodiment, channel scheduler 12 coordinates the forward link data transmissions over the entire communication system. A scheduling method and apparatus for high speed data transmission are described in detail in U.S. patent application Ser. No. 08/798,951, entitled "Method and Apparatus for Forward Link Rate Scheduling," filed Feb. 11, 1997, assigned to the assignee of the present invention and incorporated by reference herein.

According to an embodiment, the channel scheduler 12 is implemented in a computer system which includes a processor, random access memory (RAM) and a program memory for storing instructions to be executed by the processor (not shown). The processor, RAM and program memory may be dedicated to the functions of the channel scheduler 12. In other embodiments, the processor, RAM and program memory may be part of a shared computing resource for performing additional functions at the base station controller 10.

Figure 3:
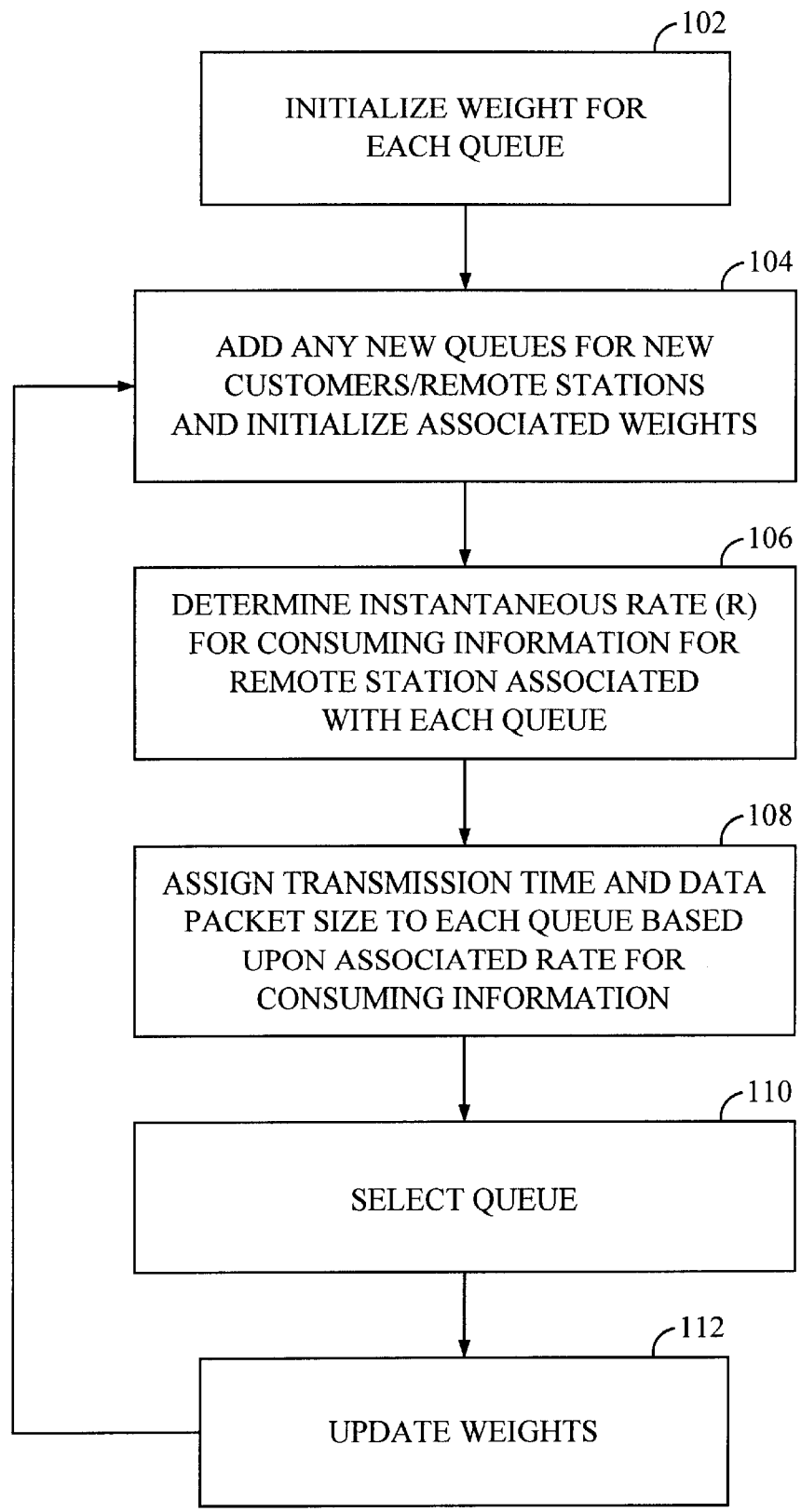
FIG. 3 shows a flow diagram illustrating the execution of a scheduling algorithm in an embodiment of the channel scheduler shown in FIG. 2.

FIG. 3 shows an embodiment of a scheduling algorithm which controls the channel scheduler 12 to schedule transmissions from the base station 4 to the remote stations 6. As discussed above, a data queue 40 is associated with each remote station 6. The channel scheduler 12 associates each of the data queues 40 with a "weight" which is evaluated at a step 110 for selecting the particular remote station 6 associated with the base station 4 to receive data in a subsequent service interval. The channel scheduler 12 selects individual remote stations 6 to receive a data transmission in discrete service intervals. At step 102, the channel scheduler initializes the weight for each queue associated with the base station 4.

A channel scheduler 12 cycles through steps 104 through 112 at transmission intervals or service intervals. At step 104, the channel scheduler 12 determines whether there are any additional queues to be added due to the association of an additional remote station 6 with the base station 4 detected in the previous service interval. The channel scheduler 12 also initializes the weights associated with the new queues at step 104. As discussed above, the base station 4 receives the DRC signal from each remote station 6 associated therewith at regular intervals such as time slots.

This DRC signal also provides the information which the channel scheduler uses at step 106 to determine the instantaneous rate for consuming information (or receiving transmitted data) for each of the remote stations associated with each queue. According to an embodiment, a DRC signal transmitted from any remote station 6 indicates that the remote station 6 is capable of receiving data at any one of eleven effective data rates shown in Table 1. Such a variable rate transmission system is described in detail in U.S. patent application Ser. No. 08/965,705, entitled "Method for Assigning Optimal Packet Lengths in a Variable Rate Communication System," filed Nov. 7, 1997, assigned to the assignee of the present invention and incorporated by reference herein.

TABLE 1

| Effective Data Rate ($R_i$) | Data Transmitted in Service Interval (Data_Size ($L_i$)) (bits) | Length/Transmission Time of Service Interval ($L_i$) (time slots ≈ 1.667 msec) |
| --- | --- | --- |
| 38.4 kbps | 1024 | 16 |
| 76.8 kbps | 1024 | 8 |
| 102.4 kbps | 1024 | 6 |
| 153.6 kbps | 1024 | 4 |
| 204.8 kbps | 1024 | 3 |
| 307.2 kbps | 1024 | 2 |
| 614.4 kbps | 1024 | 1 |
| 921.6 kbps | 1536 | 1 |
| 1228.8 kbps | 2048 | 1 |
| 1843.2 kbps | 3072 | 1 |
| 2457.6 kbps | 4096 | 1 |

The channel scheduler 12 at step 108 determines the length of a service interval during which data is to be transmitted to any particular remote station 6 based upon the remote station's 6 associated instantaneous rate for receiving data (as indicated in the most recently received DRC signal). According to an embodiment, the instantaneous rate of receiving data $R_i$ determines the service interval length $L_i$ associated with a particular data queue at step 106. Table 1 summarizes the $L_i$ values for each of the eleven possible rates for receiving data at a remote station 6.

The channel scheduler 12 at step 110 selects the particular data queue for transmission. The associated quantity of data to be transmitted is then retrieved from a data queue 40 and then provided to the channel element 42 for transmission to the remote station 6 associated with the data queue 40. As discussed below, the channel scheduler 12 at step 110 selects the queue for providing the data which is transmitted in a following service interval using information including the weight associated with each of the queues. The weight associated with the transmitted queue is then updated at step 112.

Figure 4:
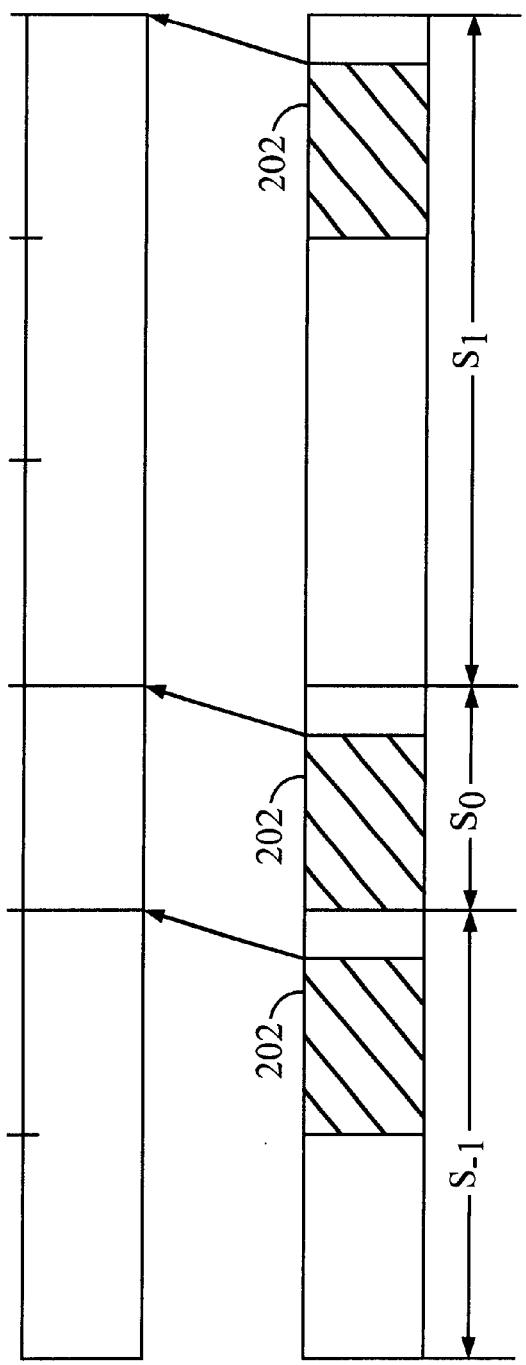
FIG. 4 shows a diagram illustrating the timing of the execution of an embodiment of the scheduling algorithm shown in FIG. 3.

FIG. 4 shows a diagram illustrating the timing of the channel scheduler 12 and data transmission in service intervals. FIG. 4 shows three discrete service intervals during transmission at time intervals $S_{-1}$, $S_0$ and $S_1$. As steps 104 through 112 of the scheduling algorithm of FIG. 4 are executed during service intervals 202, the scheduling algorithm executing during the interval $S_0$ preferably determines which queue is to be transmitted at the interval $S_1$. Also, as discussed below, the execution of steps 104 through 112 relies on information in the DRC signals received from the remote stations 6. This information is preferably extracted from the most recently received DRC signals. Accordingly, the steps 104 through 110 are preferably executed and completed during the last time slot of the service intervals. This ensures that the decisions for allocating the subsequent service interval are based upon the most recent DRC signals (i.e., those DRC signals which are in the time slot immediately preceding the execution of the steps 104 through 110).

Steps 104 and 110 are preferably completed within a time slot while providing sufficient time for the channel scheduler 12 to schedule the transmissions for the subsequent service interval. Thus the processor and RAM employed in the channel scheduler 12 are preferably capable of performing the steps 104 through 112 within the time constraints illustrated in FIG. 4. That is, the processor and RAM are preferably sufficient to execute steps 104 through 110, starting at the beginning of a time slot and completing steps 104 through 110, within sufficient time before the end of the time slot for the channel scheduler 12 to schedule transmissions in a subsequent service interval.

One skilled in the art will appreciate that channel scheduler 12 may be implemented using a variety of approaches without departing from the present invention. For example, channel scheduler 12 may be implemented using a computer system including a processor, random access memory (RAM) and a program memory for storing instructions to be executed by the processor (not shown). In other embodiments, the functions of channel scheduler 12 may be incorporated into a shared computing resource also used to perform additional functions at the base station 4 or the base station controller 10. In addition, the processor used to perform channel scheduler functions may be a general-purpose microprocessor, digital signal processor (DSP), programmable logic device, application specific integrated circuit (ASIC), or other device capable of performing the algorithms described herein, without departing from the present invention.

Figure 5:
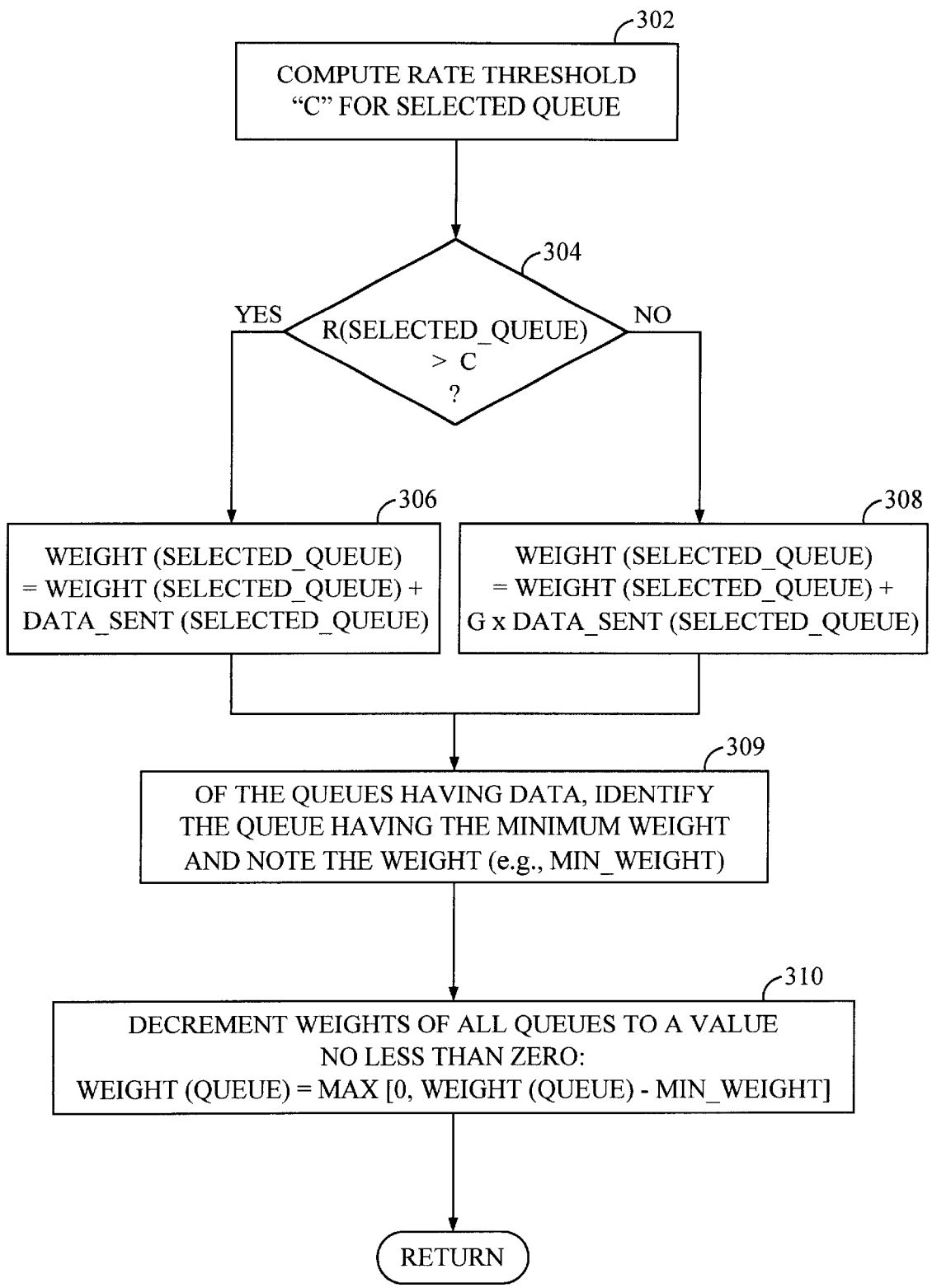
FIG. 5 shows flow diagram illustrating an embodiment of the process for updating the weights for a selected queue in the embodiment identified in FIG. 3.

FIG. 5 shows an embodiment of the process for updating the weights at step 112 (FIG. 3). Step 302 computes a rate threshold "C" which is an average of all of the instantaneous rates associated with queues having data. The instantaneous rates associated with queues which do not include data are preferably eliminated for this calculation. Step 304 compares the instantaneous rate associated with the Selected_Queue selected at step 110. If an instantaneous rate associated with a Selected_Queue exceeds the threshold C, step 306 increments the weight associated with this Selected_Queue by a lower value which is preferably a number representing the quantity of data to be transmitted during the subsequent service interval from the Selected_Queue in units such as bits, bytes or megabytes. If the instantaneous rate associated with the Selected_Queue does not exceed the threshold calculated at step 302, step 308 increments the weight of the Selected_Queue by a higher value which is preferably a multiple "G" of the quantity of data which is to be transmitted during the subsequent service interval from the Selected_Queue such as bits, bytes or megabyte quantities.

The selection of G is preferably based upon a fairness criteria which favors the allocation of service intervals to remote stations 6 having the capacity to receive data at higher rates. The system designer selects the size of G based upon the extent to which remote stations 6 receiving data at the higher rates are to be favored over the slower receiving remote stations 6. The larger the value of G, the more efficiently the forward link of the base station 4 is utilized. This efficiency, however, comes at the cost of depriving the subscribers of the slower receiving remote station 6 of the transmission resources of the forward link. The system designer therefore preferably selects the value of G in a manner which balances the two competing objectives of 1) enhancing the overall efficiency of the forward link and 2) preventing accute deprivation of the slower receiving remote stations 6.

Steps 304, 306 and 308 illustrate that selected queues having a faster associated instantaneous data rate (i.e., exceeding the threshold C) will tend to have the associated weight incremented by only a small amount, while selected queues having a lower data rate (i.e., not exceeding the threshold C) will have its associated weight incremented by a significantly greater amount. As discussed below in connection with the algorithm performed at step 110 of FIG. 3, this implementation tends to favor servicing remote stations which receive data at relatively faster rates over those remote stations receiving data at lower data rates.

This tendency enhances the throughput efficiency of the base station 4 in transmitting data in the forward link. However, as the weights associated with the often selected queues associated with the remote stations having the higher rates of receiving data (i.e., exceeding the threshold C) continue to be incremented, these weights eventually approach the weights of the queues associated with the less often selected queues associated with the remote stations having the slower rates of receiving data (i.e., not exceeding the threshold). The selection process at step 110 will then begin to favor the slower receiving remote stations as the weights of the faster receiving remote stations begin to exceed the weights of the slower receiving remote stations. This imposes a fairness restraint on the selection process at step 110 by preventing the faster receiving remote stations from dominating the forward link transmission resources of the base station to the exclusion of the slower receiving remote stations.

It is an objective of the present embodiment to ensure that queues having no data to transmit are not given an unfair preference for transmission over those queues having data. At steps 102 and 104, all new queues are initialized with a weight of zero. Without being selected, such queues will continue to maintain the weight of zero provided that the queue is not selected. Therefore, step 310 in FIG. 5 decrements the weight of all queues, to a value no less than zero, by the minimum weight of any queue with data (determined at step 309). This is illustrated in detail below in an example shown in Table 2.

TABLE 2

| | Weights at the End of the Service Interval | | | Remote Station Selected in | Remote Station Serviced in | Amount by Which Weights |
| --- | --- | --- | --- | --- | --- | --- |
| Service Interval | Remote Station 1 | Remote Station 2 | Remote Station 3 | Service Interval | Service Interval | are Decremented |
| 0 | 0 | 0 | 0 | N/A | N/A | N/A |
| 1 | 1 | 0 | 0 | 1 | N/A | 0 |
| 2 | 1 | 1 | 0 | 2 | 1 | 0 |
| 3 | 0 | 0 | 7 | 3 | 2 | 1 |
| 4 | 1 | 0 | 7 | 1 | 3 | 0 |
| 5 | 0 | 0 | 6 | 2 | 1 | 1 |
| 6 | 1 | 0 | 6 | 1 | 2 | 0 |
| 7 | 0 | 0 | 5 | 2 | 1 | 1 |

This example has three remote stations each associated with a queue of to be transmitted from a base station. The example assumes that remote ion 1 has the highest data rate, remote station 2 has the next highest data and remote station 3 has the lowest data rate. For simplicity, it is assumed these data rates do not change over the service intervals 1 through 7. It is also assumed that the data rates at remote station 1 and remote station 2 each exceed the threshold C at step 304, and that the data rate associated with remote station 3 does not exceed this threshold. It is further assumed that step 306 will increment the weight of the Selected_Queue by one if the Selected_Queue is associated with the remote station 1 or remote station 2, and that step 308 will increment the weight of the Selected_Queue by eight if the Selected_Queue is associated with the remote station 3.

At service interval 1, the channel scheduler 12 selects the remote station 1 to receive data in the subsequent service interval, since, while it has the lowest weight along with remote stations 2 and 3, remote station 1 has a higher rate of receiving data. Data is then transmitted to remote station 1 during service interval 2 and the weight associated with the remote station 1 is incremented by one at the end of service interval 1. The channel scheduler 12 then selects remote station 2 to receive data in service interval 3 (since remote station 2 has the lowest weight and a faster rate of receiving data than does remote station 3). As shown in Table 2, the weight of remote station 2 is incremented by 1 by the end of the service interval 2.

At the beginning of service interval 3, remote station 3 has the lowest weight. The channel scheduler 12 selects remote station 3 to receive data at the service interval 4. The state at the end of interval 3 reflects that weight of the remote station 3 was incremented from zero to eight to reflect the selection of the remote station 3. The weights at the remote stations 1, 2 and 3 are then decremented by one which is consistent with step 310 (FIG. 5) as indicated in Table 2. At service interval 4, the channel scheduler 12 selects remote station 1 to receive data in service interval 4 since the queue associated with remote station 1 has the lowest weight and the highest rate for receiving data.

The channel scheduler 12 at service interval 5 selects remote station 2 to receive data during service interval 6. The weight associated with the remote station 2 is first incremented at step 306 and the weights of all of the remote stations are decremented by one as reflected in the weights at the end of the service interval 5 as shown in Table 2. Remote station 1, having the lowest weight, is then selected again in service interval 6 for receiving data in service interval 7.

As shown in the embodiment of FIG. 1, the remote stations 6 are mobile and capable of changing associations among the different base stations 4. For example, a remote station 6f is initially receiving data transmissions from the base station 4f. The remote station 6f may then move out of the cell of the base station 4f and into the cell of the base station 4g. The remote station 6f can then start transmitting its DRC signal to alert the base station 4g instead of the base station 4f. By not receiving a DRC signal from the remote station 6f, logic at the base station 4f deduces, that the remote station 6f has disengaged and is no longer to receive data transmissions. The data queue associated with the remote station 6f may then be transmitted to the base station 4g via a land line or RF communication link.

According to an embodiment of the present invention, the channel scheduler 12 at a base station 4 assigns a weight to a queue of a remote station 6 which has disengaged and re-engaged the base station 4. Rather than simply assigning a weight of zero to the re-engaging remote station 6, the base station 4 preferably assigns a weight which does not give the re-engaging remote station an unfair advantage for receiving data transmissions from the base station 4. In one embodiment, the channel scheduler 12 randomly assigns a weight to the queue of the re-engaging remote station 6 according to a uniform distribution between zero and the highest weight of any queue currently serviced by the channel scheduler 12. In another embodiment, the base station 4 receives the weight of the re-engaging remote station 6 from the last base station associated with the remote station 6 via a land line transmission.

In an alternative embodiment, the channel scheduler 12 gives a re-engaging remote station 6 "partial credit" for having a past association with the base station 4. The channel scheduler 12 determines the number of time slots that the previous service interval spans "n," and maintains a history of the number of time slots "$m_i$" during the previous service interval that the base station 4 received a DRC from the remote station i. The weight of the queue associated with the remote station i is then decremented at step 310 as follows:

$$W_i = W_i - m_i/n \times W_{min}$$

where:

$W_i$=the weight of queue i $W_{min}$=the minimum weight of any queue with data to transmit to a remote station $m_i$=the number of time slots during the previous service interval that the base station received a DRC from the remote station i n=the number of time slots that the previous service interval spans.

Figure 6A:
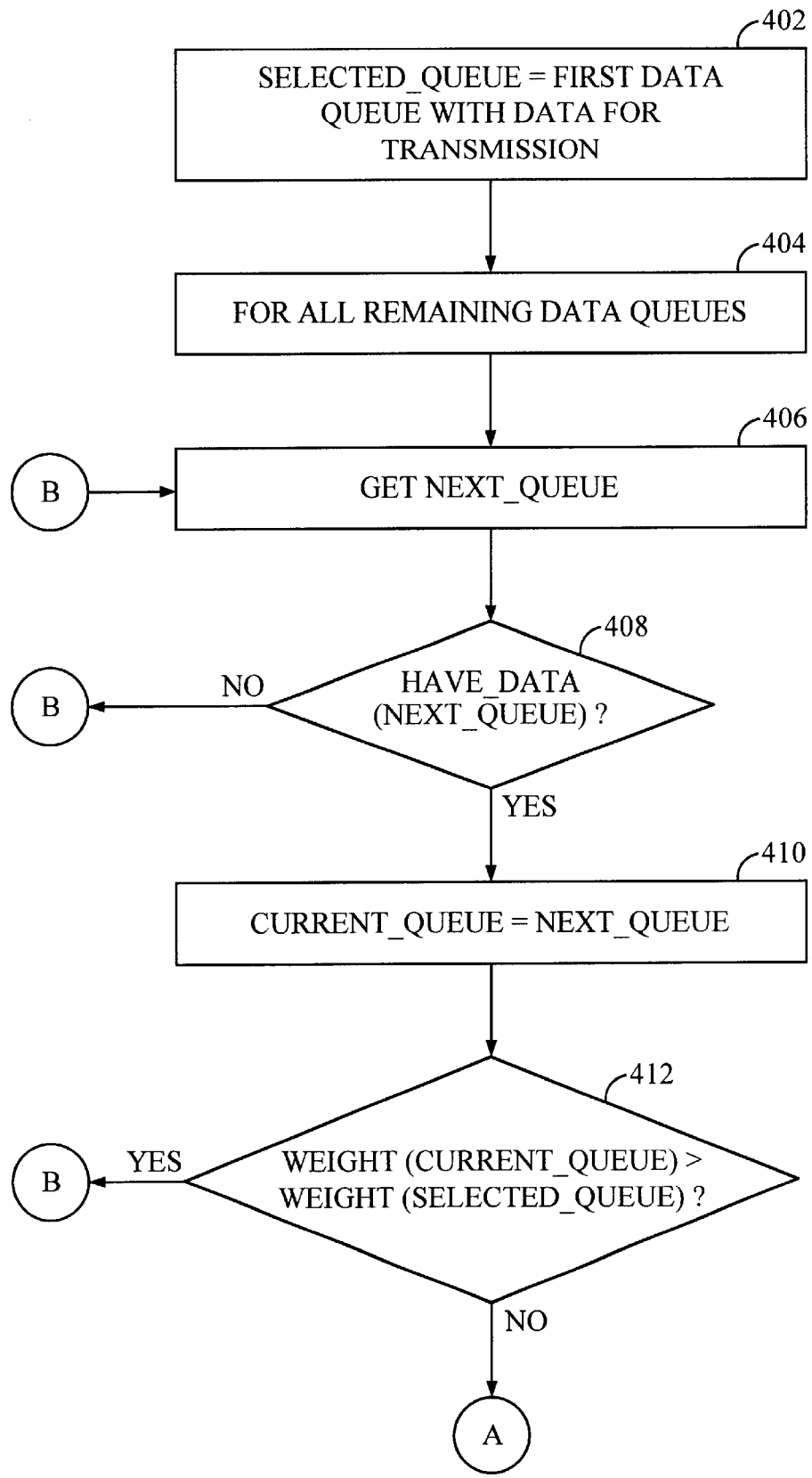
FIGS. 6a through 6c show a flow diagram illustrating a first embodiment of the process for selecting a queue to receive data transmission in a service interval identified in FIG. 3.
Figure 6B:
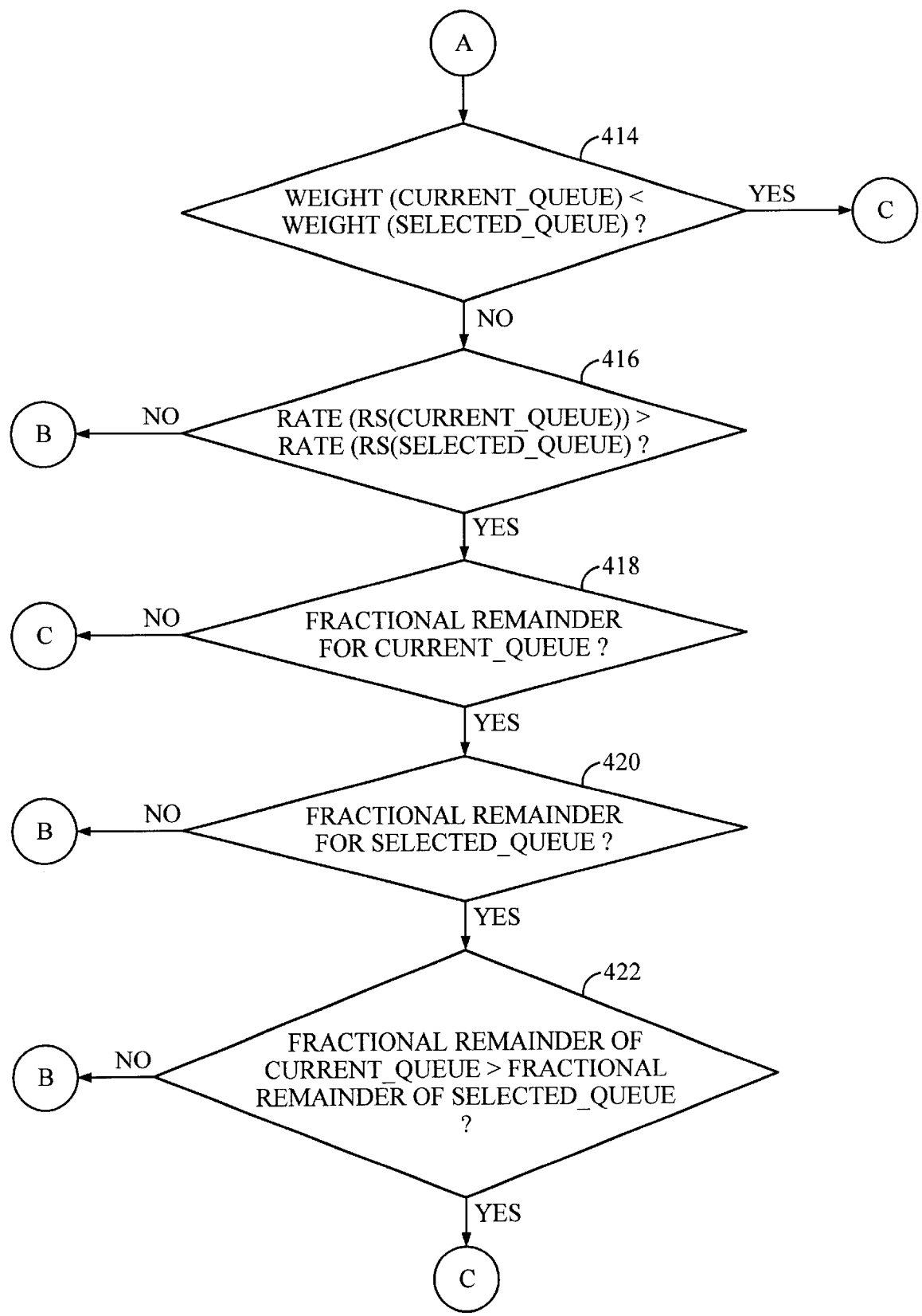
Figure 6C:
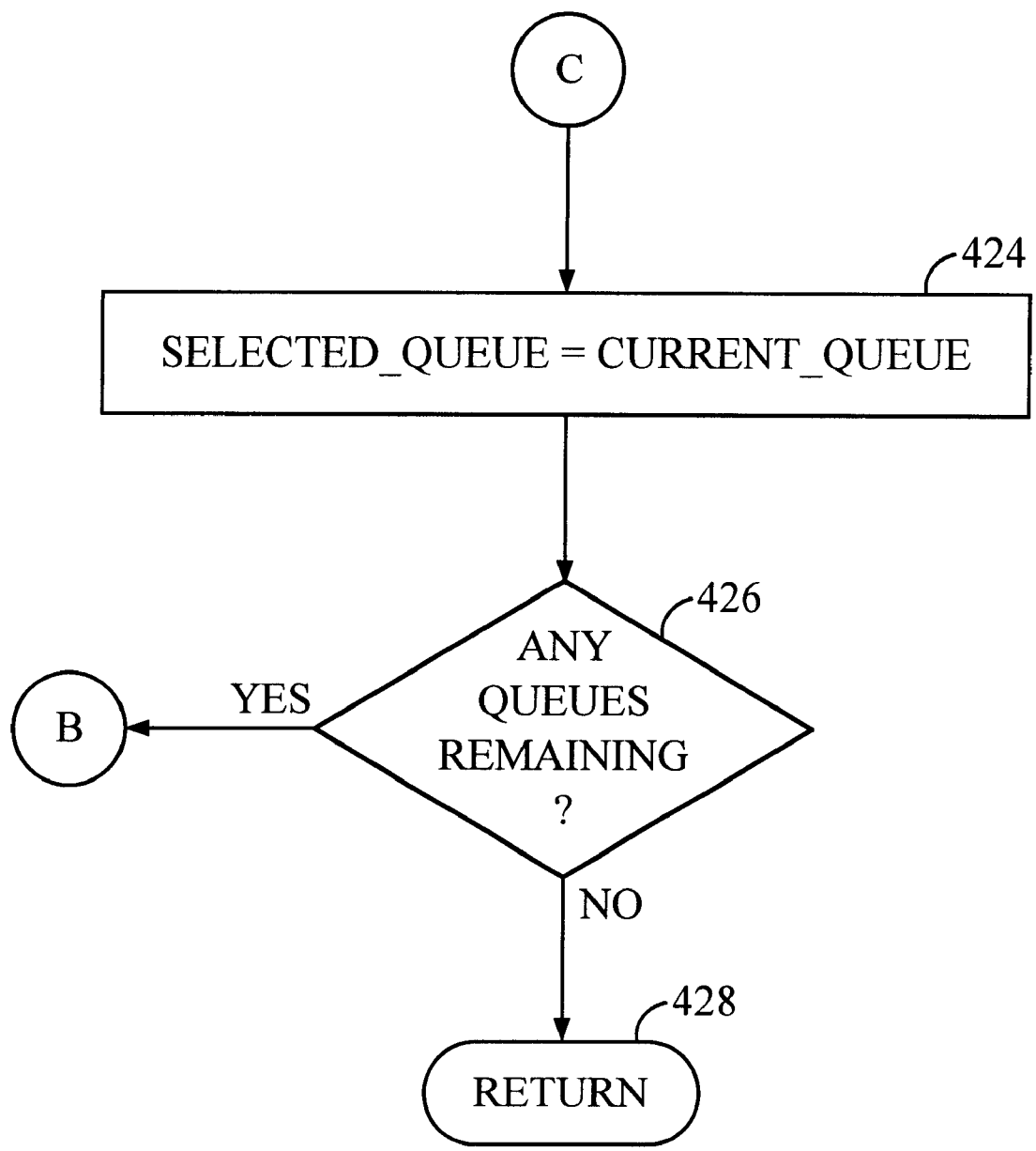

FIGS. 6a through 6c show a flow diagram illustrating the logic performed at step 110 (FIG. 3) according to an embodiment. Step 402 initializes the identity of the Selected_Queue as being the first data queue having data for transmission to an associated remote station 6. At steps 402 through 422, the channel scheduler 12 determines whether this initial queue or a different data queue having data should be selected for transmission to its associated remote station 6. The Next_Queue is then retrieved at step 406 and step 408 determines whether this Next_Queue has data. If the Next_Queue does not have data, execution returns to step 406 to select a subsequent data queue. Otherwise, if this Next_Queue has data, the identity of the Current_Queue is assigned the Next_Queue. If the weight of the Current_Queue exceeds the weight of the Selected_Queue, step 412 returns execution to step 406 to retrieve a subsequent Next_Queue. Otherwise, step 414 determines whether the weight of the Current_Queue is less than the weight of the Selected_Queue. If the weight of the Current_Queue is less than the weight of the Selected_Queue, step 414 moves execution to step 420 to assign the identity of the Current_Queue to the Selected_Queue.

Otherwise, the logic at steps 412 and 414 dictate that if execution reaches step 416, the weights of the Current_Queue and the Selected_Queue are equal. Step 424 assigns the Current_Queue as the Selected_Queue when the following conditions are met:

1) the instantaneous rate of receiving data associated with the Current_Queue exceeds the instantaneous rate of receiving data associated with the Selected_Queue (step 416); and 2) if the service interval assigned to the Current_Queue would exhaust all of the data stored in the Current_Queue, leaving a fractional remainder of data in the service interval assigned to the Current_Queue, such a fractional remainder would not exceed any such fractional remainder of data in the Selected_Queue in the service interval assigned to the Selected_Queue (steps 418 through 422).

Otherwise, execution returns to step 406 to select the Next_Queue.

Figure 7A:
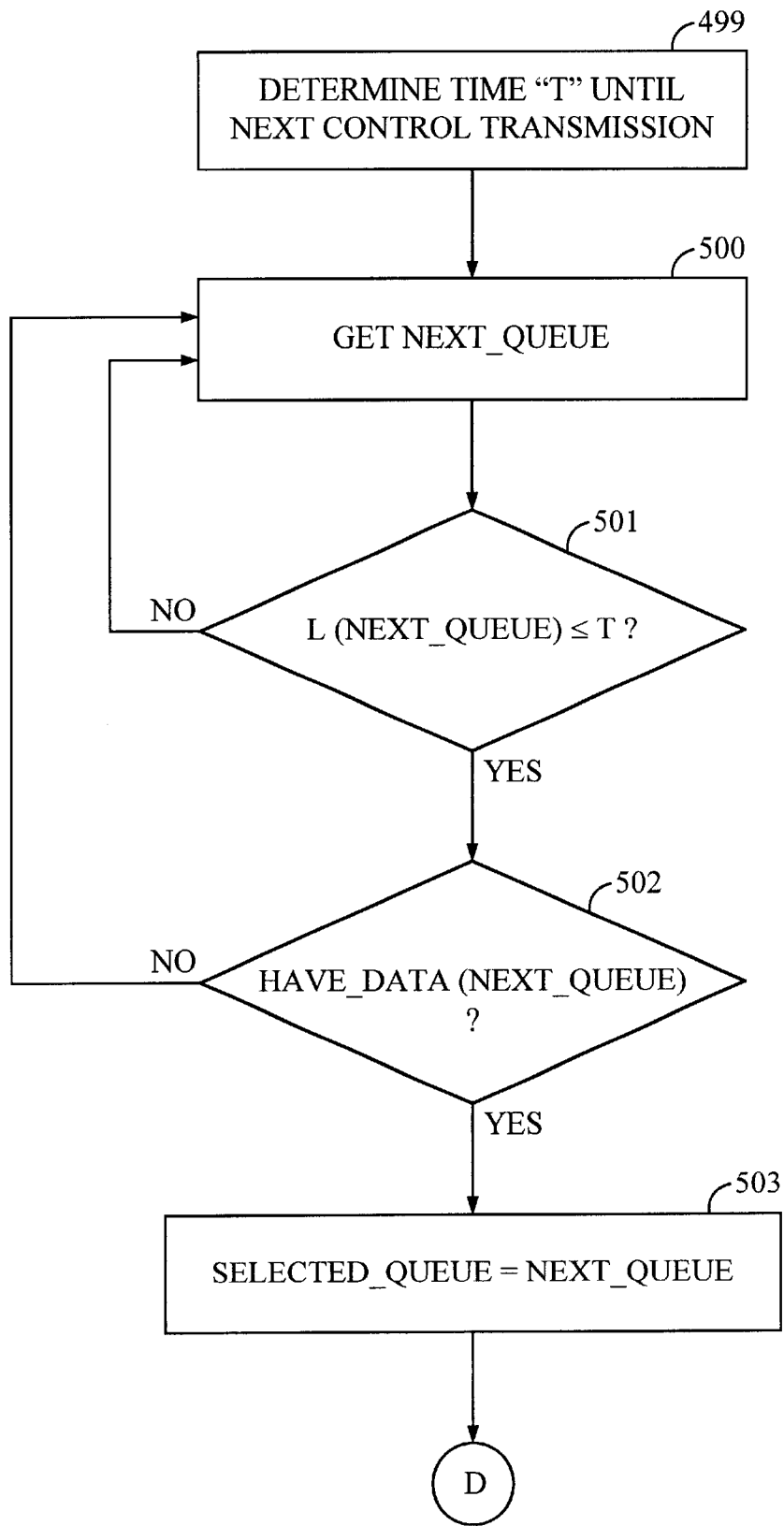
FIGS. 7a through 7d show a flow diagram illustrating a second embodiment of the process or selecting a queue to receive data transmission in a service interval identified in FIG. 3.
Figure 7B:
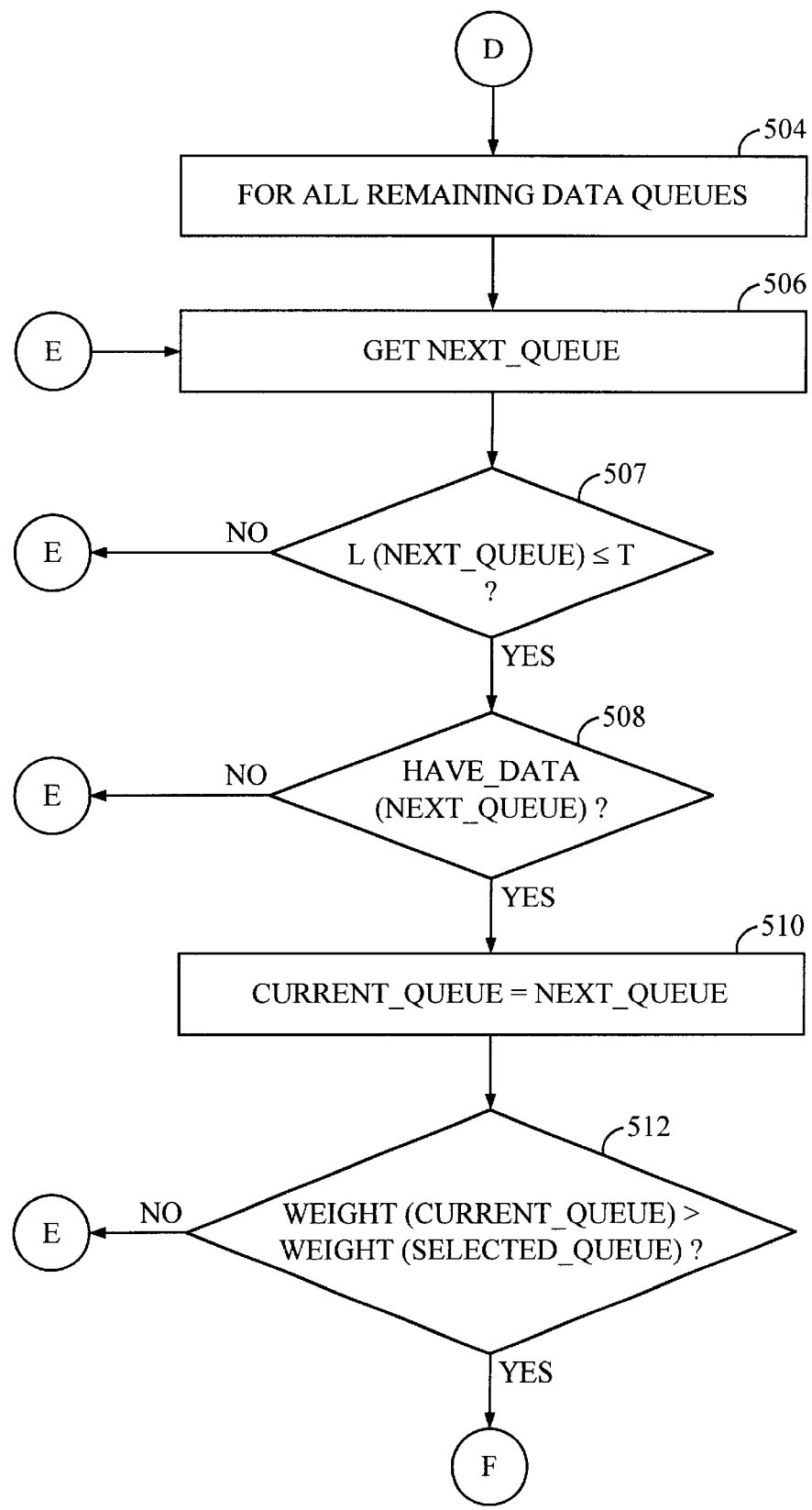
Figure 7C:
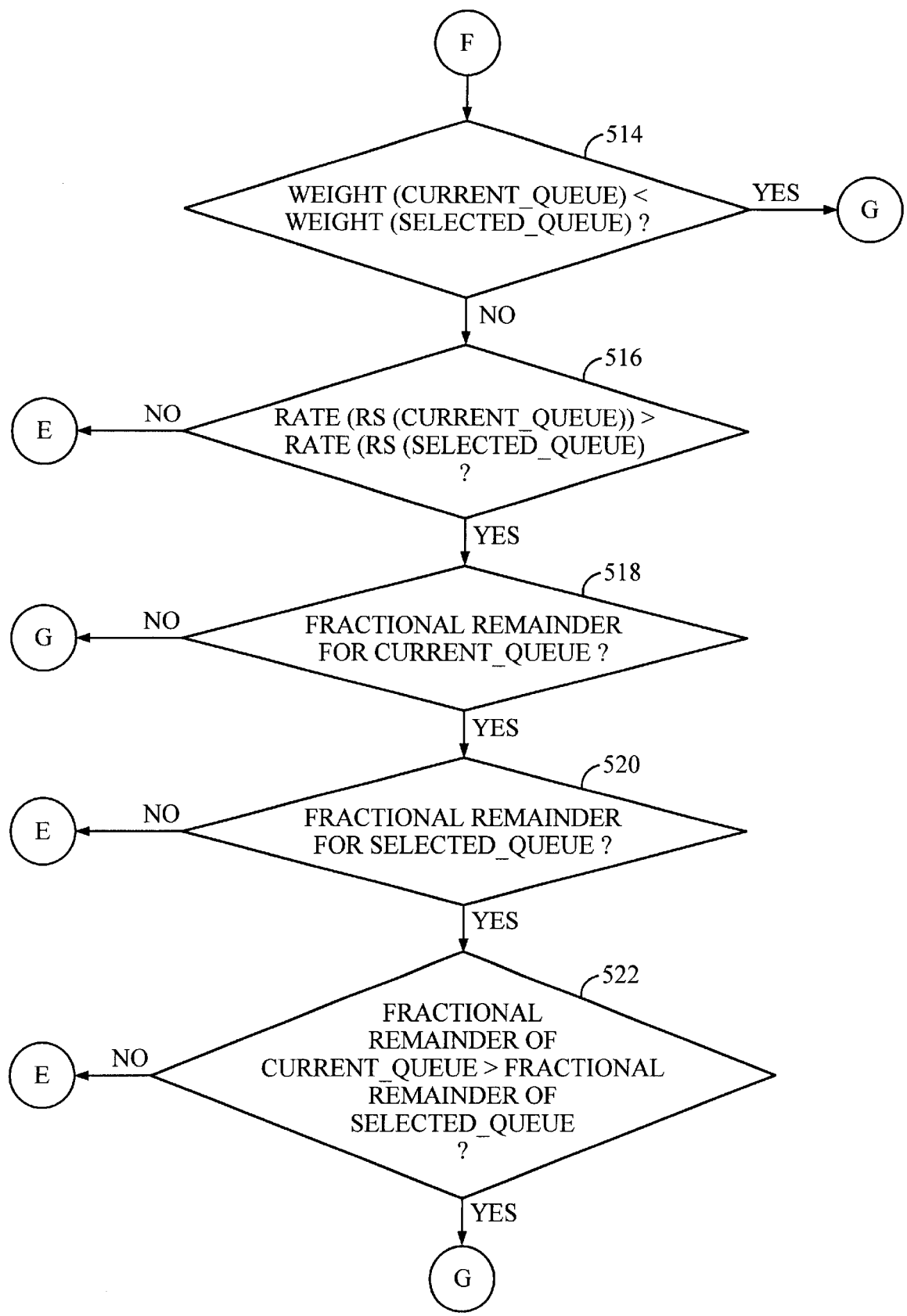
Figure 7D:
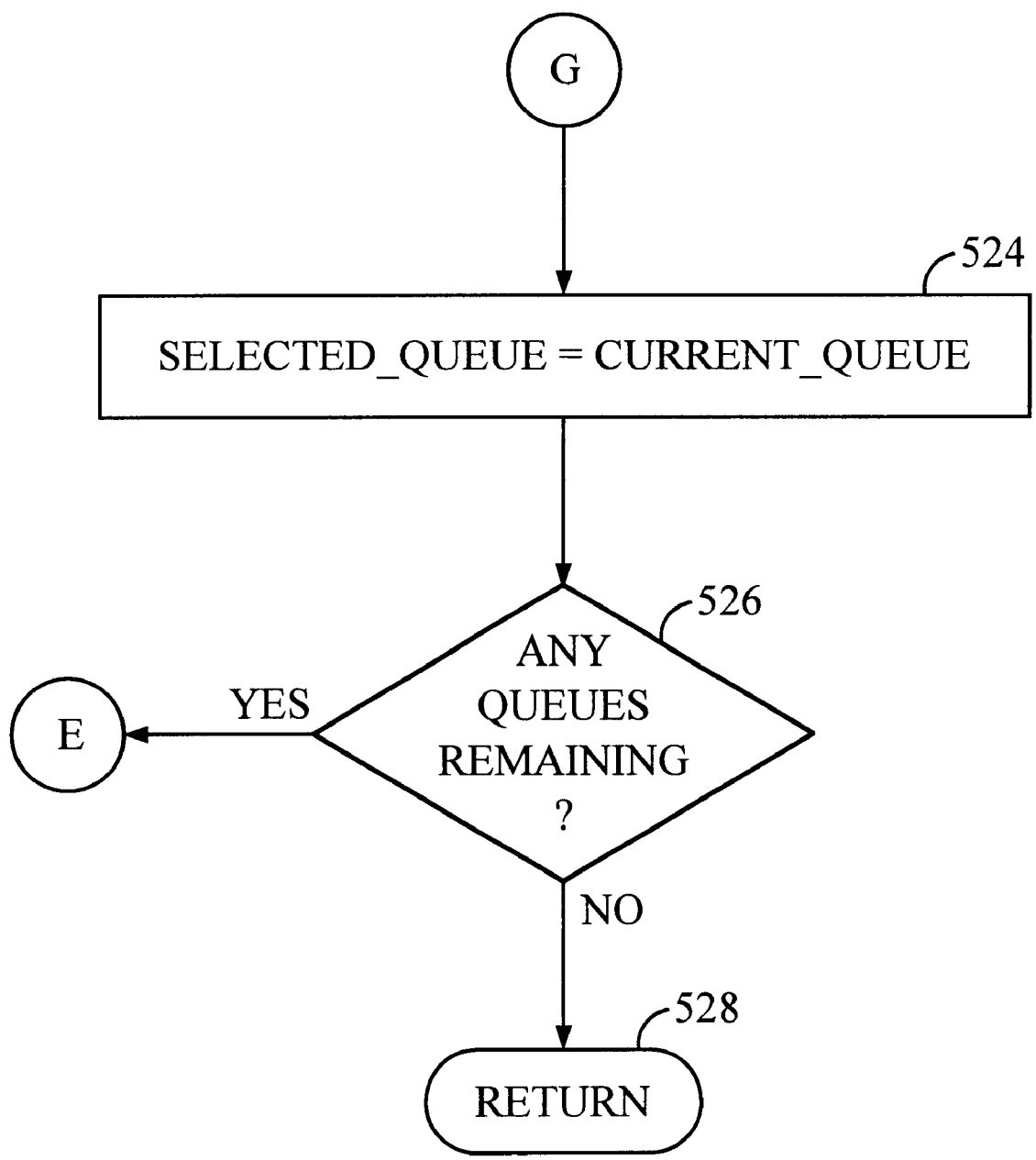

FIGS. 7a through 7d show a flow diagram illustrating a second embodiment of the logic performed at the step 110 for selecting a queue for transmission to an associated remote station 6. In this embodiment, it is assumed that each base station 4 periodically transmits a control signal to all associated remote stations 6 having a fixed duration (such as eight to sixteen time slots). According to an embodiment, the base station 4 transmits this control signal once every 400 msec. During this control transmission, no data from any data queue 40 (FIG. 2) may be transmitted to an associated remote station 6. An objective of the embodiment shown at FIGS. 7a and 7b is to select only those data queues which may completely transmit for a service interval having a length determined at step 108 before the beginning of the next control signal transmission.

Steps 499 through 507 filter all of the queues to determine which queues are candidates for completion before the beginning of the next control signal transmission. Step 499 determines the time "T" until the next control signal transmission by, for example, subtracting the scheduled time of the beginning of the next control signal transmission by the beginning of the next scheduled service interval. Step 501 determines whether the length of service interval associated with each queue determined at step 108 can be transmitted within the time T based upon the instantaneous rate of transmission for the remote unit 6 associated with the queue determined at step 106. According to an embodiment, step 501 compares the service interval length with T. Step 502 then determines whether the Next_Queue includes any data. If the Next_Queue satisfies the conditions at steps 501 and 502, the identity of the Next_Queue is assigned to the Selected_Queue.

Steps 504 through 508 examine the remaining data queues to determine the data queues having associated service interval (determined at step 108) which may be completely transmitted prior to the beginning of the next control signal transmission. Upon meeting the criteria set forth at steps 507 and 508, the Current_Queue is assigned as the Next_Queue. Steps 512 through 526 then perform a selection process according to queue weights in a manner similar to that discussed above in connection with steps 412 through 426 in FIGS. 6a through 6c. However, in the embodiment of FIGS. 7a through 7d, only those data queues having an assigned packet length which may be completed prior to the beginning of the next control signal transmission may be candidates for selection based upon the associated queue weight.

Figure 8A:
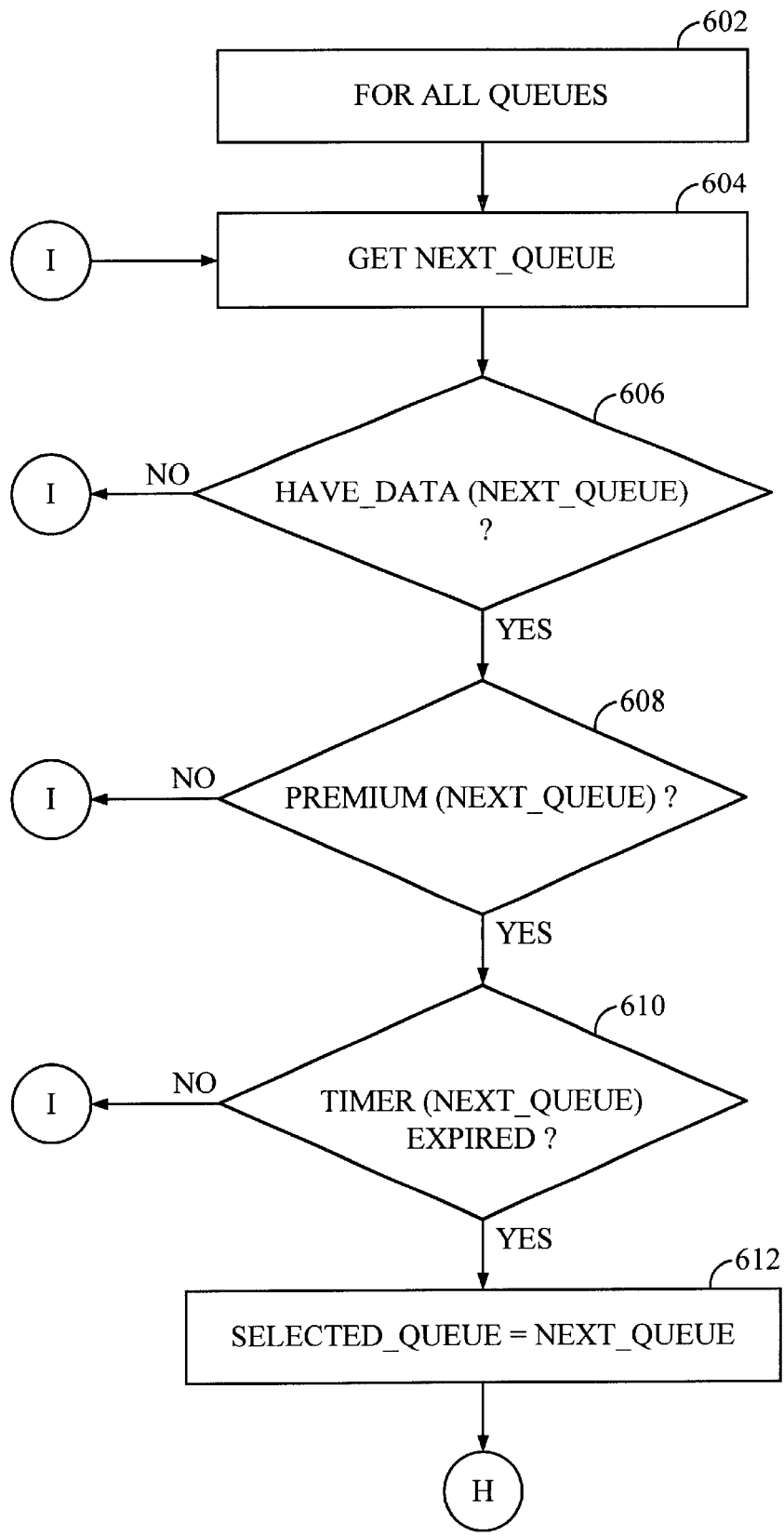
FIGS. 8a and 8b show a flow diagram illustrating a third embodiment of the process for selecting a queue to receive data transmission in a service interval identified in FIG. 3.
Figure 8B:
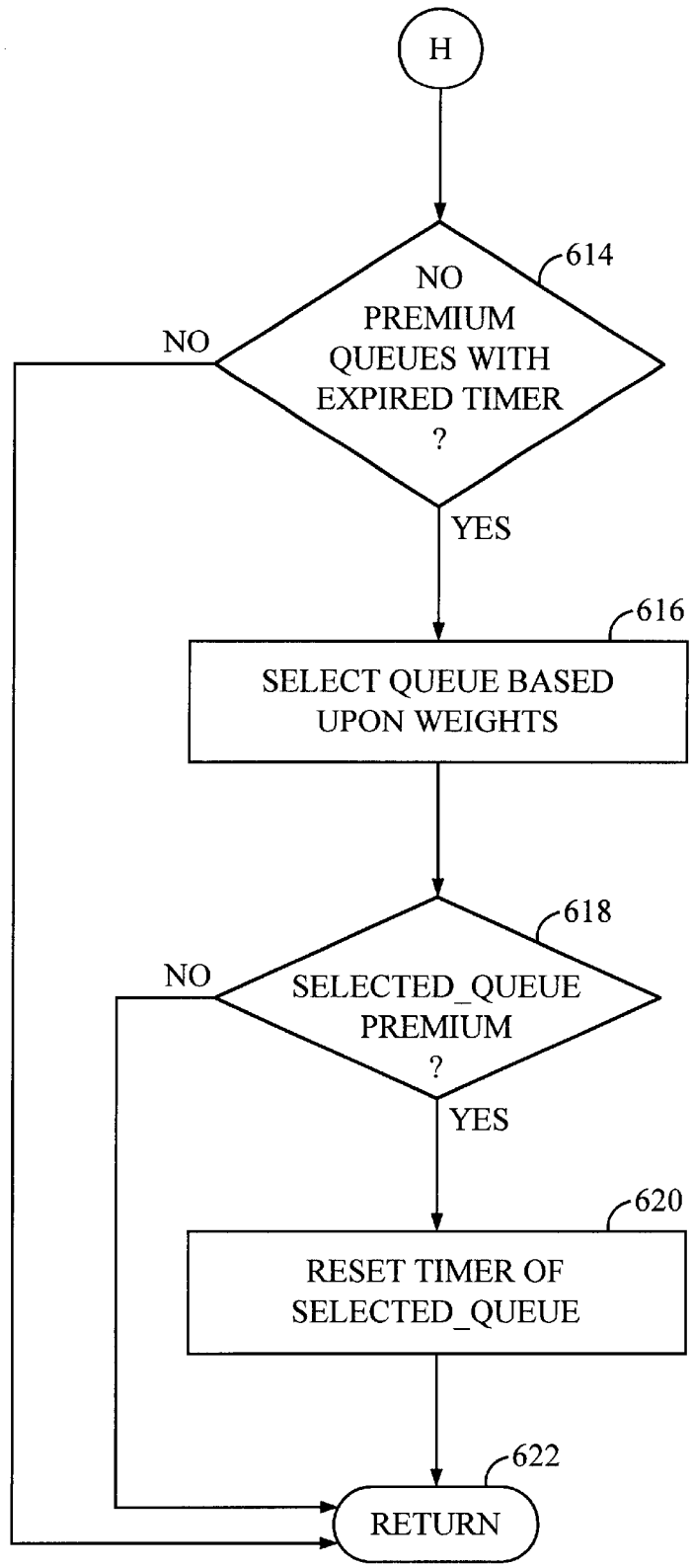

FIGS. 8a and 8b show a flow diagram illustrating a third embodiment of the logic executed at step 110 at FIG. 3 for selecting a queue for transmission. In this embodiment, subscribers of select remote units 6 are guaranteed a minimum average rate of data transmission. For each such premium remote unit, the channel scheduler 12 maintains a timer which alerts the channel scheduler 12 to schedule a transmission to its premium queue, regardless of the weights associated with the remaining queues. The time interval for the particular timer is determined based upon the average data rates guaranteed to the customer, the service interval assigned to that data queue at step 108 (see center column of Table 1), and any instantaneous data rate for receiving data determined at step 106. Thus, the time interval associated with the premium queue timer is dynamic with respect to these values. According to an embodiment, the timer interval is determined whenever the timer is reset as follows:

$$T_j = \frac{\text{Data\_Size}(L_j)}{r_j}$$

where:

$T_j$=timer interval for premium queue j

Data$_{\_Size\,(Lj)}$—quantity of data to be transmitted in service interval assigned to the premium queue j $r_j$=average data transmission rate guaranteed to the premium subscriber associated with the premium queue j.

The timer is reset at either of two events. The first event initiating a reset of the timer is an expiration of the timer interval. The second event for initiating a reset of the timer is a selection of the associated premium data queue based upon its associated weight in a manner discussed above with reference to FIGS. 6a through 6c.

Steps 606 through 610 determine whether the Next_Queue is a premium queue entitled to a minimum average rate of receiving data and, if so, whether the timer associated with that premium queue has expired. If the timer has expired, step 612 assigns the identity of the Next_Queue to the Selected_Queue and execution at step 110 completes. The weight of the selected queue is then updated at step 112 as discussed above. If there are no premium queues with an expired timer, step 614 initiates the selection of the queue for transmission in the subsequent service interval at step 616 based upon the weights of the queues in a manner discussed above with references to FIGS. 6a through 6c. If the queue selected at step 616 is a premium queue having an associated timer, step 618 initiates a reset of the timer associated with the selected queue at step 620.

As outlined above, the timer associated with any particular premium data queue is reset following its selection based upon the associated weight at step 620. The associated timer is also reset when it expires before selection of the data queue. The timer thus alerts the channel scheduler 12 to override the logic directed to selecting data queues based upon weights to ensure that this subscriber is associated with the premium data queues receive a guaranteed minimum average rate of receiving data.

Figure 9:
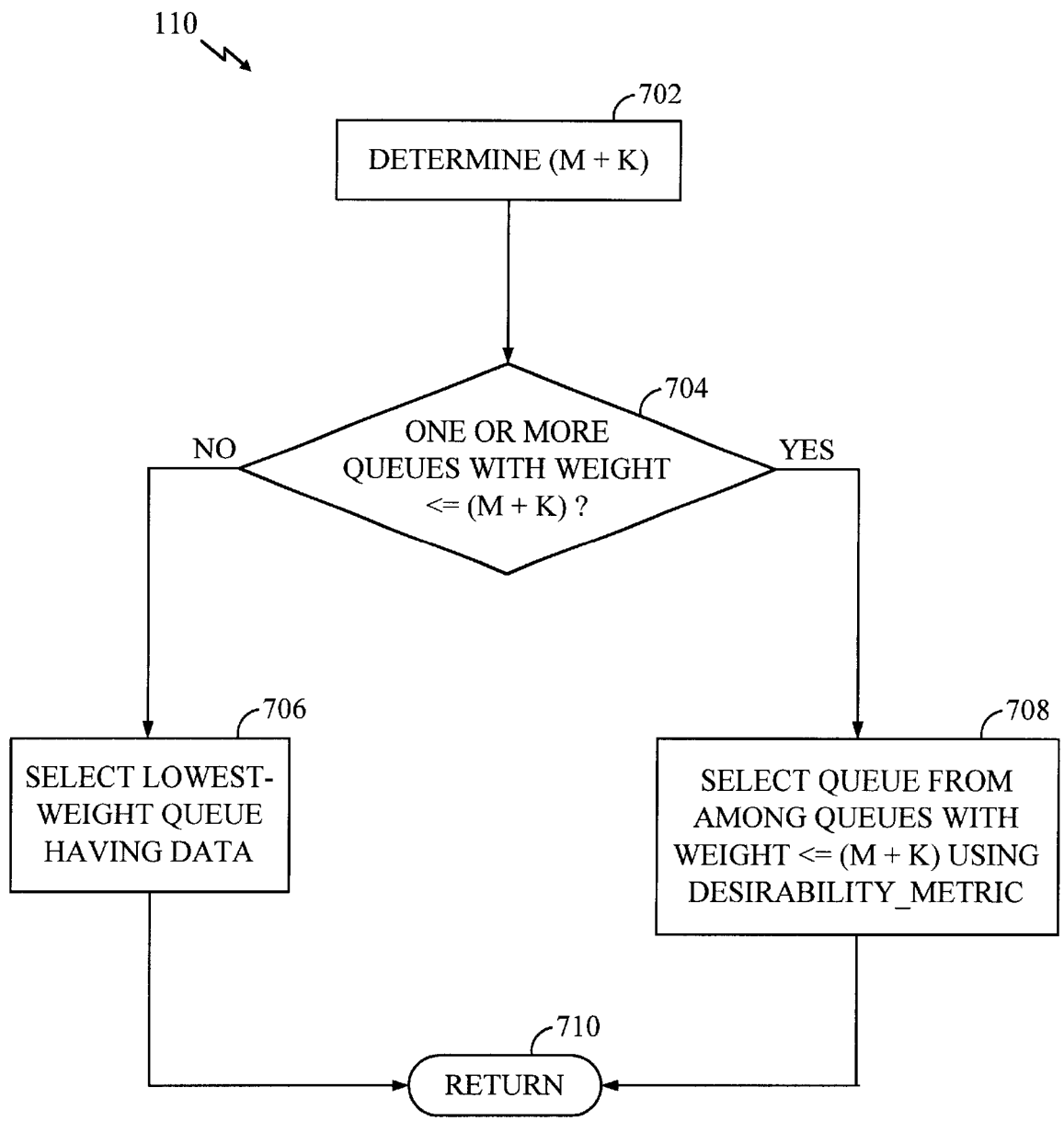
FIG. 9 shows a high level flow diagram illustrating an alternate process for updating the weights for a selected queue in the embodiment identified in FIG. 3.

FIG. 9 shows an alternate embodiment of the process for updating the weights at step 110 (FIG. 3). This alternate embodiment allows the selection of a queue that does not have the smallest weight. Volatility in transmission rates makes it advantageous to sometimes select a queue that does not have the smallest weight. For example, a queue might have the lowest weight during a time slot when its requested rate is temporarily low. If the rate increases in a subsequent time slot, then transmission can then take place at the higher rate. Waiting a few time slots may allow transmission from that low-weight queue at a higher requested rate.

The alternate embodiment begins with step 702 by determining the sum of the values M and K. M is the minimum weight of all queues, including those with no data to send or with invalid DRC values. K is an offset used to define a range of weight values within which a queue is selected based on a Desirability Metric.

After determining the sum of M and K, a decision is made in step 704 about whether or not to use the Desirability Metric for queue selection. The Desirability Metric is only used to choose among queues having weights less than or equal to (M+K) as well as having valid DRC's and data to send.

First, all queues having valid DRC's and data to send are evaluated to determine how many also have a weight greater than the sum (M+K). If all queues having valid DRC's and data to send also have weights greater than the sum (M+K), then the lowest-weight queue among them is selected in step 706. If one or more queues with valid DRC's and data to send have a weight less than or equal to (M+C), then one of those queues is selected in step 708 according to the Desirability Metric.

Once a queue is selected in either step 706 or step 708, then queue selection is complete (shown as step 710), and processing continues from step 110 to 112 as in FIG. 3.

Figure 10:
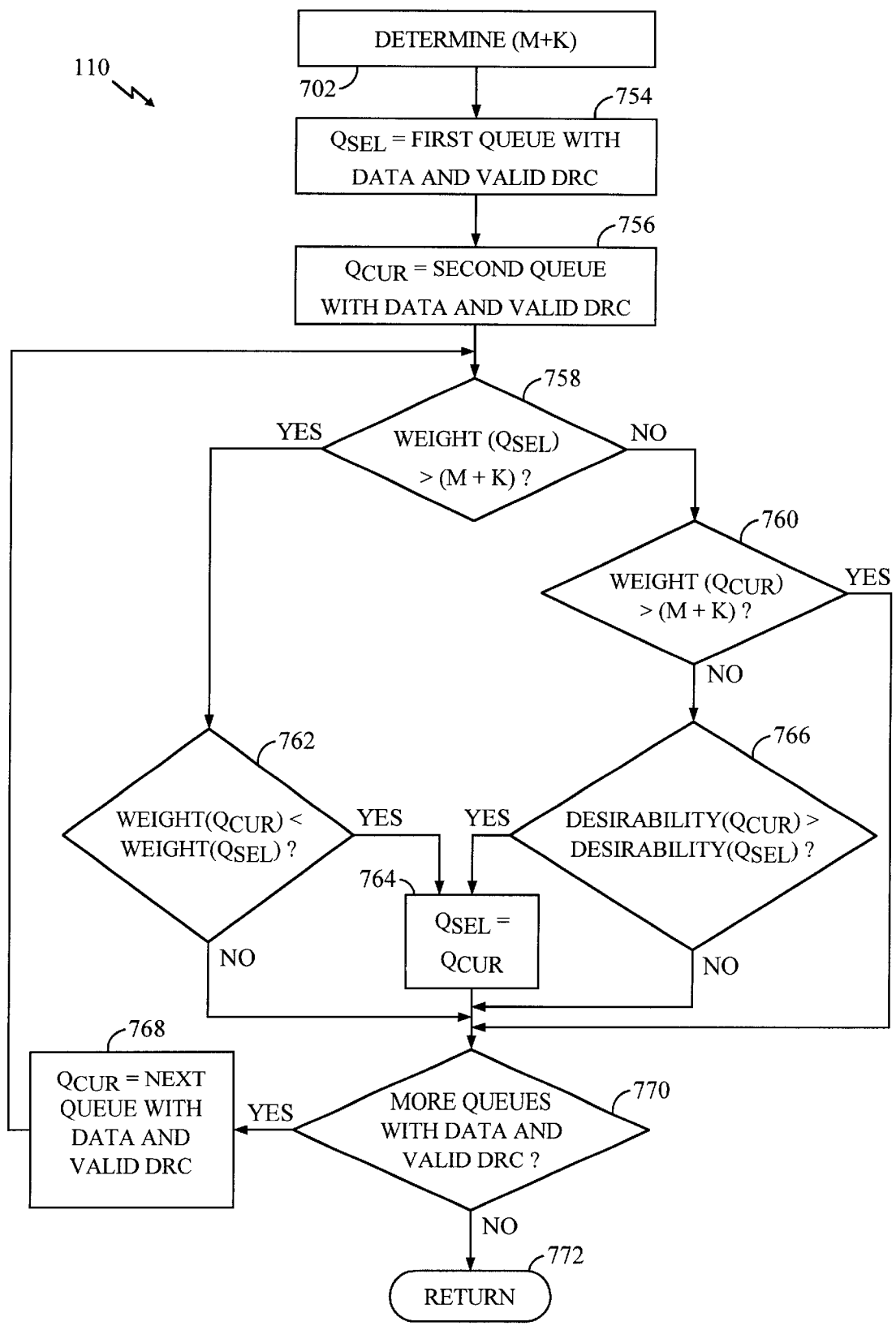
FIG. 10 shows a detailed flow diagram of an embodiment of the process shown in FIG. 9.

FIG. 10 is a more detailed flow chart depicting an exemplary embodiment of the queue selection method depicted in FIG. 9. In FIG. 10, after determining in step 702 the sum (M+K), each queue that has a valid DRC and data to send is evaluated and one queue is selected and returned from step 110.

In the exemplary embodiment, the first step 702 is again to determine the sum (M+K). If there are no queues having data and a valid DRC, then no queue is selected and the method proceeds to step 772 (return to the flow of FIG. 3). If there is only one queue in the list having data and a valid DRC, that queue is returned. Otherwise, $Q_{SEL}$ and $Q_{CUR}$ are assigned in steps 754 and 756 from the two or more queues having data and a valid DRC. $Q_{SEL}$ represents the currently selected queue, and ($Q_{CUR}$ represents the current queue being compared with $Q_{SEL}$. Each queue having data and a valid DRC is compared with $Q_{SEL}$, and if certain selection criteria are met, that queue replaces the current $Q_{SEL}$. After all queues have been evaluated, the $Q_{SEL}$ remaining is the selected queue for transmission and is returned at step 772.

At step 758, the weight of the selected queue $Q_{SEL}$ is compared to (M+K). If the weight of $Q_{SEL}$ is greater than (M+K), then the decision in step 762 of whether to replace $Q_{SEL}$ with $Q_{CUR}$ in step 764 is based solely on which queue has the lower weight. If at step 758 the weight of selected queue $Q_{SEL}$ is less than or equal to (M+K), then the weight of current queue $Q_{CUR}$ is compared to (M+K) at step 760. If only $Q_{SEL}$ is less than or equal to (M+K), then $Q_{CUR}$ is not selected and the method proceeds to step 770. If the weights of both $Q_{SEL}$ and $Q_{CUR}$ are less than or equal to (M+K), then in step 766 the queues are evaluated according to a Desirability Metric. If $Q_{CUR}$ is deemed more desirable than $Q_{SEL}$ according to the Desirability Metric, then $Q_{CUR}$ becomes the new selected queue $Q_{SEL}$ in step 764).

After each queue is evaluated, step 770 checks for queues having data to send and a valid DRC that remain to be evaluated. If more such queues remain to be evaluated, then one is selected in step 768 as the next $Q_{CUR}$, and is evaluated beginning at step 758. If no more queues remain to be evaluated, then the selected queue $Q_{SEL}$ is returned at step 772.

Several alternate embodiments of the present invention vary in the method used to determine K. In some embodiments, K is simply a constant. In other embodiments, K is calculated at the beginning of each round of queue selections. Some alternate embodiments also differ in the Desirability Metric used. Any methods of determining K or Desirability Metrics may be used without departing from the present invention.

In a particular embodiment using a "Modified Grade of Service (GOS)" algorithm, K is a constant that does not depend on the number of remote stations in the system. A filtered average throughput is maintained for each user and associated queue according to the following equation:

Average_Throughput={(11/TC)* Old_Average_Throughput}+(1/TC*Rate)     (1)

where Average_Throughput is the average throughput for each queue used in calculating the Desirability Metric value of the queue, TC is a time constant, Old_Average_Throughput is the previous value of Average_Throughput, and Rate is the bit rate used to transmit from the queue in each time slot. The Average_Throughput is updated for each queue for every transmission time slot. For all queues except the selected queue in each time slot, the Rate will be zero. The Desirability Metric value of any queues evaluated at steps 708 or 766 are determined according to the following equation:

Desirability_Metric=Current_Requested_Rate−Average_Throughput     (2)

where Current_Requested_Rate is the DRC rate of the queue and Average_Throughput is as calculated in Equation (1).

One skilled in the art will appreciate that other formulas may be used to determine the Desirability Metric and the updated average throughput. For example, the formula for updating the average throughput may take into account more values of requested rate than the current value, such as the previous two requested rate values. Additionally, TC may vary over time based on the number of active users in the system or based on the variability of previous requested rates. Some of the alternate formulas that can be used to compute the Desirability Metric are described below.

The Modified GOS algorithm is advantageous in that it allows optimization of queue selection in an environment where DRC rates are changing over time. So, although one queue has the lowest weight during a particular time slot, that queue might not be selected if it is experiencing a transient decrease in its requested DRC rate. The Modified GOS algorithm permits a limited delay in transmission to such a queue in anticipation that the rate will increase for one of the subsequent time slots.

In an alternate embodiment using a "Modified GOS High DRC" algorithm, the Desirability Metric value is equal to the average throughput computed according to Equation (1). This algorithm results in slightly lower overall throughput, but requires less computational complexity. The Modified GOS High DRC algorithm does not require maintenance of a filtered average throughput value for each queue.

In another alternate embodiment using a "Hybrid" algorithm, the Desirability Metric value is equal to the Rate divided by Average_Throughput. The Hybrid algorithm sacrifices throughput to achieve a greater degree of "fairness" in selecting a queue for transmission by selecting a queue based on the percentage by which the requested rate exceeds the average rate. For example, the algorithm selects a first user having a requested Rate of 76.8K and an Average_Throughput of 30K instead of a second user having a requested Rate of 1228.8K and an Average_Throughput of 900K. Although greater overall throughput can be achieved by taking advantage of the rate spike of the second user, the Hybrid algorithm chooses the first user because the first user has a current rate that is more than twice his or her average throughput.

In a suboptimal embodiment, the Hybrid algorithm is modified by varying K according to the number of users to create a "Modified Hybrid" algorithm. In the Modified Hybrid algorithm, K is inversely proportional to the number of users, and the Desirability Metric value is equal to the Rate divided by Average_Throughput. By varying K according to the number of users to modify the Modified GOS and Modified GOS High DRC algorithms, similar alternate suboptimal embodiments are created.

In an alternate suboptimal embodiment, the Hybrid algorithm is modified by varying K according to the number of users to create a "Modified Hybrid" algorithm. The Modified Hybrid algorithm seeks to impose an additional degree of "fairness" at the expense of throughput.

Figure 11A:
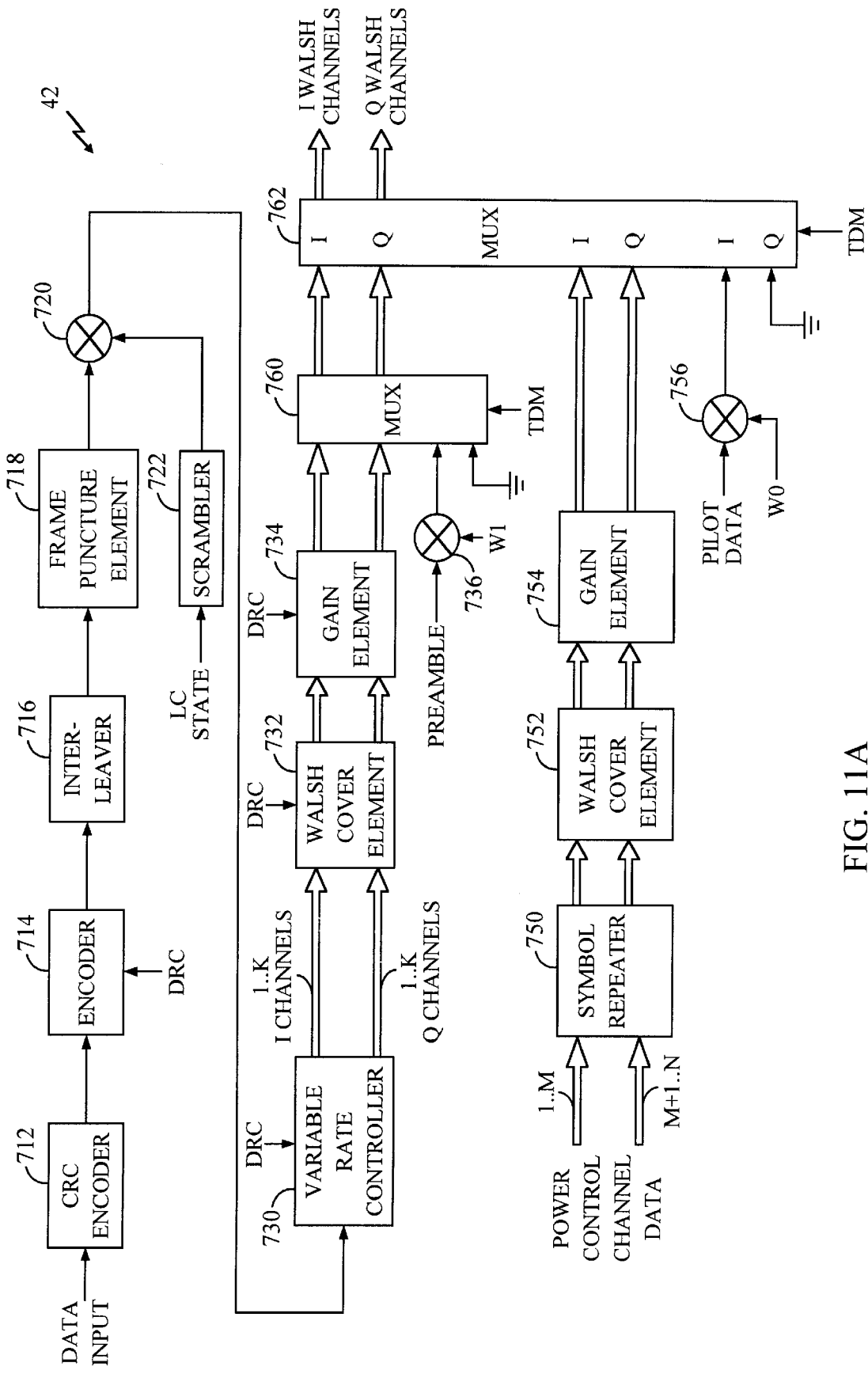
FIGS. 11a–11b are block diagrams of the exemplary forward link architecture of the present invention.

FIG. 11a is a block diagram of a forward link architecture configured in accordance with an exemplary embodiment of the present invention. The data is partitioned into data packets and provided to CRC encoder 712. For each data packet, CRC encoder 712 generates frame check bits (e.g., the CRC parity bits) and inserts code tail bits. The formatted packet from CRC encoder 712 comprises the data, the frame check and code tail bits, and other overhead bits described below. In the exemplary embodiment, encoder 714 encodes the formatted packet in accordance with the encoding format disclosed in U.S. patent application Ser. No. 08/743,688, entitled "SOFT DECISION OUTPUT DECODER FOR DECODING CONVOLUTIONALLY ENCODED CODEWORDS", filed Nov. 6, 1996, assigned to the assignee of the present invention and incorporated by reference herein. One skilled in the art will appreciate that other well known encoding formats can also be used and are within the scope of the present invention. The encoded packet from encoder 714 is provided to interleaver 716, which reorders the code symbols in the packet. The interleaved packet is provided to frame puncture element 718, which removes a fraction of the packet in a manner described below. The punctured packet is provided to multiplier 720, which scrambles the data with the scrambling sequence from scrambler 722. Puncture element 718 and scrambler 722 are described in detail in the aforementioned U.S. patent application Ser. No. 08/963,386. The output from multiplier 720 comprises the scrambled packet.

The scrambled packet is provided to variable rate controller 730, which demultiplexes the packet into K parallel inphase and quadrature channels, where K is dependent on the data rate. In the exemplary embodiment, the scrambled packet is first demultiplexed into the inphase (I) and quadrature (Q) streams. In the exemplary embodiment, the I stream comprises even-indexed symbols and the Q stream comprises odd-indexed symbols. Each stream is further demultiplexed into K parallel channels such that the symbol rate of each channel is fixed for all data rates. The K channels of each stream are provided to Walsh cover element 732, which covers each channel with a Walsh function to provide orthogonal channels. The orthogonal channel data are provided to gain element 734 which scales the data to maintain a constant total-energy-per-chip (and hence constant output power) for all data rates. The scaled data from gain element 734 is provided to multiplexer (MUX) 760, which multiplexes the data with the preamble. The preamble is discussed in detail in the aforementioned U.S. patent application Ser. No. 08/963,386. The output from MUX 760 is provided to multiplexer (MUX) 762, which multiplexes the traffic data, the power control bits, and the pilot data. The output of MUX 762 comprises the I Walsh channels and the Q Walsh channels.

In the exemplary embodiment, a forward link pilot channel provides a pilot signal that is used by remote stations 6 for initial acquisition, phase recovery, timing recovery, and ratio combining. These uses are similar to those in CDMA communication systems conforming to the IS-95 standard. In the exemplary embodiment, the pilot signal is also used by remote stations 6 to perform the C/I measurement.

The block diagram of the forward link pilot channel of the exemplary embodiment is also shown in FIG. 11A. In the exemplary embodiment, the pilot data comprises a sequence of all zeros (or all ones) which is provided to multiplier 756. Multiplier 756 covers the pilot data with Walsh code $W_0$.

Since Walsh code $W_0$ is a sequence of all zeros, the output of multiplier 756 is the pilot data. The pilot data is time multiplexed by MUX 762 and provided to the I Walsh channel which is spread by the short $PN_I$, code within complex multiplier 814 (see FIG. 11B).

The exemplary block diagram of the power control channel is also shown in FIG. 11A. The Reverse Power Control (RPC) bits are provided to symbol repeater 750, which repeats each RPC bit a predetermined number of times. The repeated RPC bits are provided to Walsh cover element 752, which covers the bits with the Walsh covers corresponding to the RPC indices. The covered bits are provided to gain element 754, which scales the bits prior to modulation to maintain a constant total transmit power. In the exemplary embodiment, the gains of the RPC Walsh channels are normalized so that the total RPC channel power is equal to the total available transmit power. The gains of the Walsh channels can be varied as a function of time for efficient utilization of the total base station transmit power while maintaining reliable RPC transmission to all active remote stations 6. In the exemplary embodiment, the Walsh channel gains of inactive remote stations 6 are set to zero. Automatic power control of the RPC Walsh channels is possible using estimates of the forward link quality measurement from the corresponding DRC channel from remote stations 6. The scaled RPC bits from gain element 754 are provided to MUX 762.

Figure 11B:
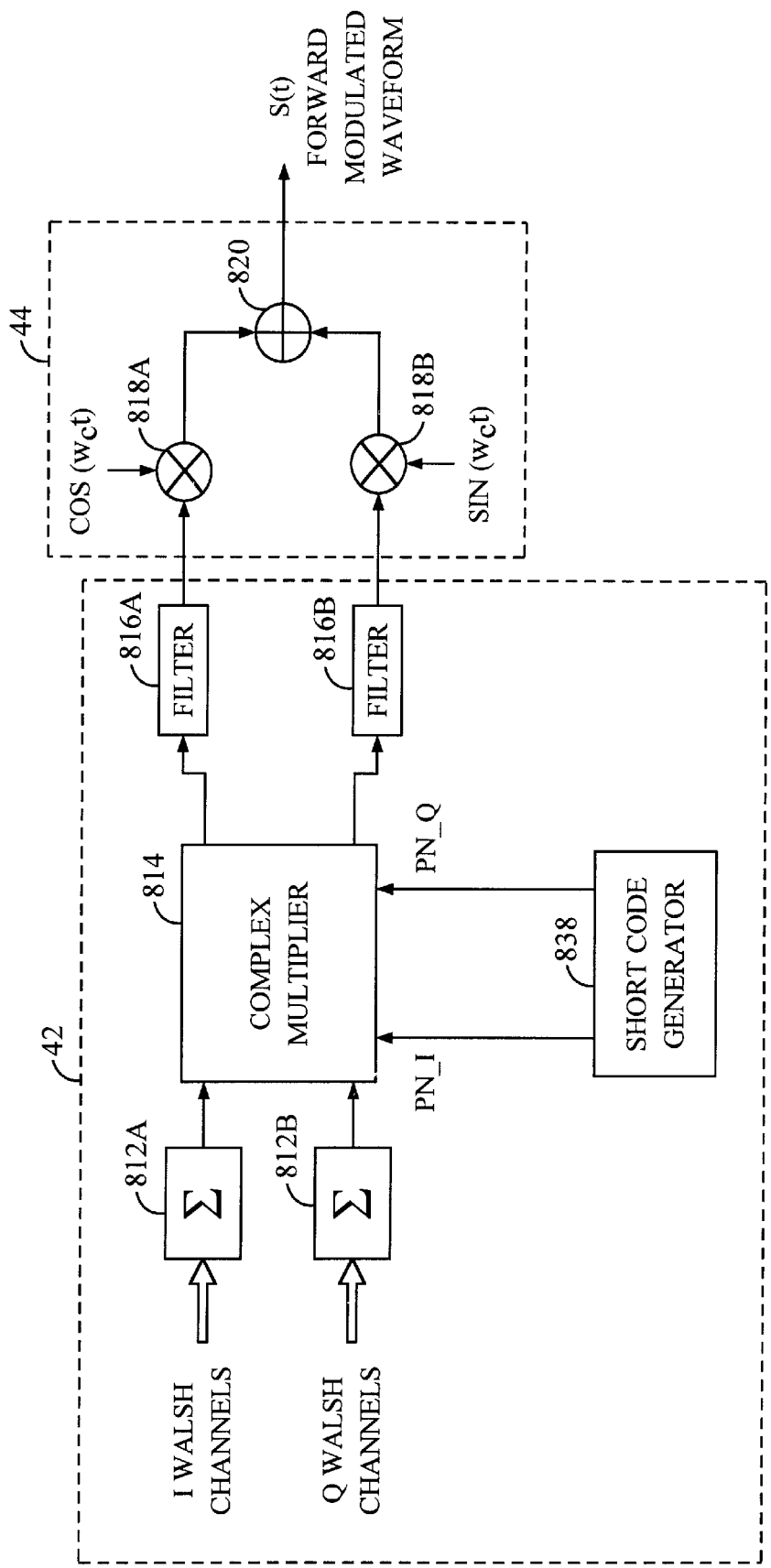

A block diagram of the exemplary modulator used to modulate the data is illustrated in FIG. 11B. The I Walsh channels and Q Walsh channels are provided to summers 812a and 812b, respectively, which sum the K Walsh channels to provide the signals $I_{sum}$ and $Q_{sum}$ respectively. The $I_{sum}$ and $Q_{sum}$ signals are provided to complex multiplier 814. Complex multiplier 814 also receives short $PN_I$, and $PN_Q$ sequences from short code generator 838, and multiplies the two complex inputs in accordance with the following equation:

$$(I_{mult} + jQ_{mult}) = (I_{sum} + jQ_{sum}) \cdot (PN\_I + jPN\_Q) \qquad (3)$$
$$= (I_{sum} \cdot PN\_I - Q_{sum} \cdot PN\_Q) +$$
$$j(I_{sum} \cdot PN\_Q + Q_{sum} \cdot PN\_I),$$

where $I_{mult}$ and $Q_{mult}$ are the outputs from complex multiplier 814 and j is the complex representation. The $I_{mult}$ and $Q_{mult}$ signals are provided to filters 816a and 816b, respectively, which filter the signals. The filtered signals from filters 816a and 816b are provided to multipliers 818a and 818b, respectively, which multiply the signals with the inphase sinusoid $COS(w_c t)$ and the quadrature sinusoid $SIN(w_c t)$, respectively. The I modulated and Q modulated signals are provided to summer 820 which sums the signals to provide the forward modulated waveform S(t).

The block diagram of the exemplary traffic channel shown in FIGS. 3A and 3B is one of numerous architectures that support data encoding and modulation on the forward link. (Other architectures, such as the architecture for the forward link traffic channel in the CDMA system conforming to the IS-95 standard, can also be utilized and are within the scope of the present invention.

For example, one skilled in the art will appreciate that complex multiplier 814 and short code generator 838 can be replaced by a pseudonoise (PN) spreader that performs simple multiplication of signals by PN short codes instead of complex multiplication. In addition, encoder 714 may use any of several forward error correction techniques including turbo-coding, convolutional coding, or other forms of soft decision or block coding. Also, interleaver 716 may utilize any of a number of interleaving techniques, including block interleaving, e.g., bit reversal interleaving, or pseudo-random interleaving.

While there has been illustrated and described what are presently considered to be the preferred embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A method of allocating a finite resource in a communication system, the communication system including a common node and a plurality of customer nodes associated with the common node, each of the customer nodes having a requested data rate, wherein during any particular service interval the common node allocates the finite resource to one of the customer nodes to the exclusion of any remaining customer nodes, the method comprising the steps of:

maintaining a set of weights having one weight corresponding to each of the customer nodes;

identifying a minimum weight M from said set of weights;

identifying a subset of said customer nodes having weights less than or equal to the sum of M and an offset K;

determining a desirability metric value for each customer node in said subset;

selecting, from said subset, a most desired customer node having the greatest desirability metric value;

exchanging data between the common node and said most desired customer node through the finite resource and at the data rate associated with said most desired customer node; and changing said set of weights based on said most desired customer node and the data rate associated with said most desired customer node.

2. The method of claim 1 wherein said offset K is a constant.

3. The method of claim 1 wherein said offset K varies based on the number of customer nodes.

4. The method of claim 1 wherein said desirability metric value for each customer node in said subset is determined by subtracting an average throughput value associated with said each customer node from the requested data rate associated with said each customer node.

5. The method of claim 4 wherein said offset K is a constant.

6. The method of claim 4 wherein said offset K varies based on the number of customer nodes.

7. The method of claim 4 further comprising the step of updating each of said average throughput values.

8. The method of claim 7 wherein said average throughput values are updated according to the formula $$NewAverageThroughput = \{(1-1/TC)*OldAverageThroughput\}+(1/TC* \text{Requested Data Rate}).$$

9. The method of claim 8 wherein TC is a constant.

10. The method of claim 8 wherein TC varies based on the number of customer nodes.

11. The method of claim 8 wherein TC varies based on previous requested data rates associated with said each customer node.

12. The method of claim 1 wherein said desirability metric value for each customer node in said subset is equal to the requested data rate for said each customer node in said subset.

13. The method of claim 12 wherein said offset K is a constant.

14. The method of claim 12 wherein said offset K varies based on the number of customer nodes.

15. The method of claim 1 wherein said desirability metric value for each customer node in said subset is determined by dividing a requested data rate associated with said each customer node by an average throughput value associated with said each customer node.

16. The method of claim 15 wherein said offset K is a constant.

17. The method of claim 15 wherein said offset K varies based on the number of customer nodes.

18. The method of claim 15 further comprising the step of updating each of said average throughput values.

19. The method of claim 18 wherein said average throughput values are updated according to the formula $$NewAverageThroughput = \{(1-1/TC)*OldAverageThroughput\}+(1/TC* \text{Requested Data Rate}).$$

20. The method of claim 19 wherein TC is a constant.

21. The method of claim 19 wherein TC varies based on the number of customer nodes.

22. The method of claim 19 wherein TC varies based on previous requested data rates associated with said each customer node.

23. A wireless transmitter apparatus comprising:

at least one antenna for receiving requested data rate signals from each of a plurality of customer nodes and for directing information signals to said plurality of customer nodes;

a channel element for modulating a data signal for transmission through said at least one antenna to each of said plurality of customer nodes; and a channel scheduler for maintaining a set of weights corresponding to each of the customer nodes, identifying a minimum weight M from said set of weights, identifying a subset of said customer nodes having weights less than or equal to the sum of M and an offset K, determining a desirability metric value for each customer node in the subset, selecting from the subset a most desired customer node having the greatest desirability metric value, providing information corresponding to the most desired customer node to said channel element, and updating the set of weights.

24. The wireless transmitter apparatus of claim 23 wherein said channel element is a CDMA channel element.

25. The wireless transmitter apparatus of claim 24 wherein said CDMA channel element further comprises a pseudonoise (PN) spreader for performing PN spreading of said most desired customer node.

26. The wireless transmitter apparatus of claim 24 wherein said CDMA channel element further comprises:

a short pseudonoise (PN) code generator for generating in-phase and quadrature-phase PN codes; and a complex multiplier for performing complex multiplication of a signal associated with said most desired customer node by said in-phase and quadrature-phase PN codes.

27. The wireless transmitter apparatus of claim 23 wherein said offset K is a constant.

28. The wireless transmitter apparatus of claim 23 wherein said offset K varies based on the number of customer nodes.

29. The wireless transmitter apparatus of claim 23 wherein said desirability metric value for each customer node in said subset is determined by subtracting an average throughput value associated with said each customer node from the requested data rate associated with said each customer node.

30. The wireless transmitter apparatus of claim 29 wherein said offset K is a constant.

31. The wireless transmitter apparatus of claim 29 wherein said offset K varies based on the number of customer nodes.

32. The wireless transmitter apparatus of claim 23 wherein said desirability metric value for each customer node in said subset is equal to the requested data rate values in said requested data rate signals for each customer node in said subset.

33. The wireless transmitter apparatus of claim 23 wherein said desirability metric value for each customer node in said subset is determined by dividing a requested data rate associated with said each customer node by an average throughput value associated with said each customer node.

* * * * *